INVENTOR.
Sven A. Stolberg,

Aug. 14, 1951 S. A. STOLBERG 2,564,455
RECORD-CHANGER
Filed July 30, 1945 16 Sheets-Sheet 3

INVENTOR.
Sven A. Stolberg,
BY
Thos. A. Banning Jr.
Atty.

Aug. 14, 1951 S. A. STOLBERG 2,564,455
RECORD-CHANGER
Filed July 30, 1945 16 Sheets-Sheet 4

INVENTOR.
Sven A. Stolberg,
BY
Atty.

Aug. 14, 1951  S. A. STOLBERG  2,564,455
RECORD-CHANGER
Filed July 30, 1945  16 Sheets-Sheet 7

INVENTOR.
Sven A. Stolberg

Aug. 14, 1951 S. A. STOLBERG 2,564,455
RECORD-CHANGER
Filed July 30, 1945 16 Sheets-Sheet 8

INVENTOR.
Sven A. Stolberg,
BY
Thos. A. Banning Jr.
Atty.

Aug. 14, 1951  S. A. STOLBERG  2,564,455
RECORD-CHANGER
Filed July 30, 1945  16 Sheets-Sheet 9

INVENTOR.
Sven A. Stolberg,
BY
Atty.

Aug. 14, 1951     S. A. STOLBERG     2,564,455
RECORD-CHANGER
Filed July 30, 1945                         16 Sheets—Sheet 10
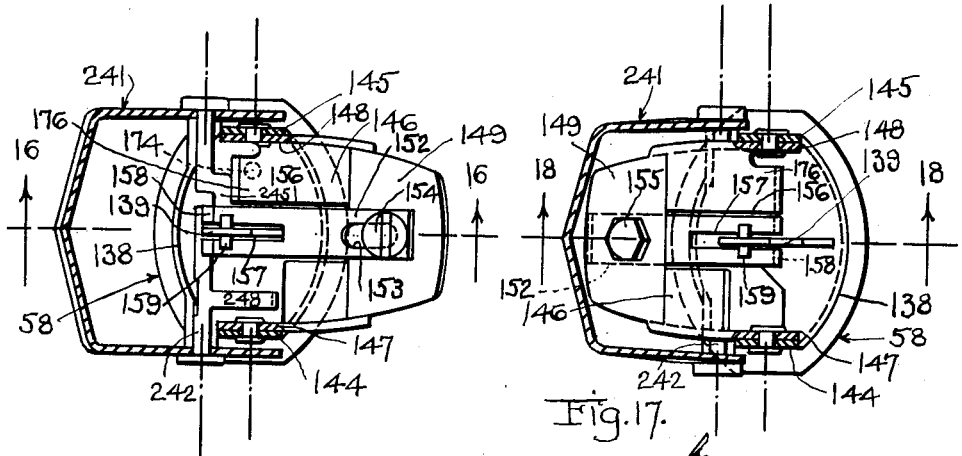
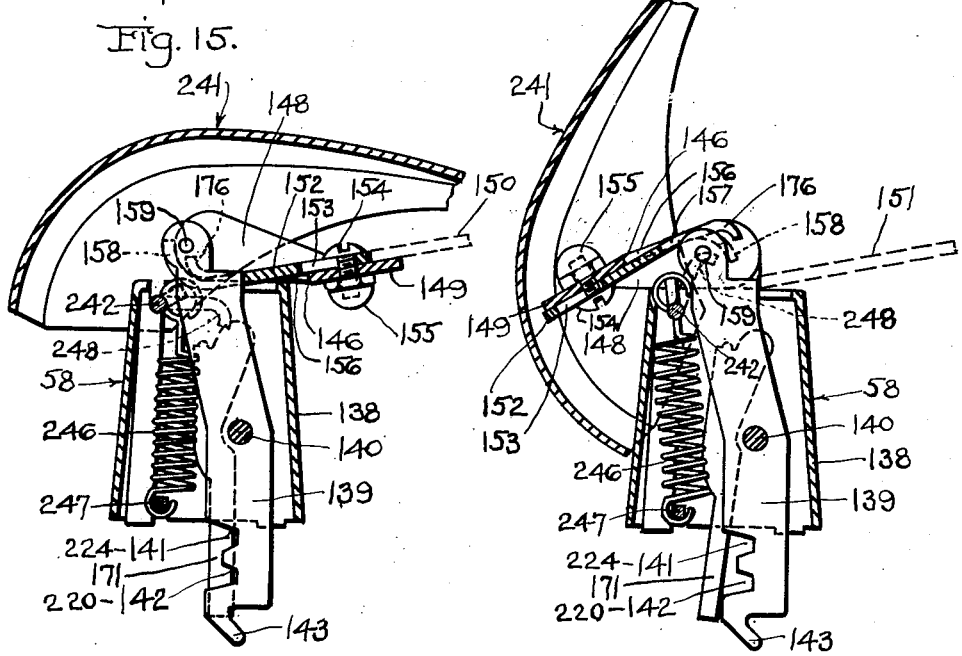
INVENTOR.
Sven A. Stolberg, Aug. 14, 1951  S. A. STOLBERG  2,564,455
RECORD-CHANGER
Filed July 30, 1945  16 Sheets-Sheet 11

INVENTOR.
Sven A. Stolberg,
BY
ATTY.

Aug. 14, 1951     S. A. STOLBERG     2,564,455
RECORD-CHANGER
Filed July 30, 1945     16 Sheets-Sheet 13
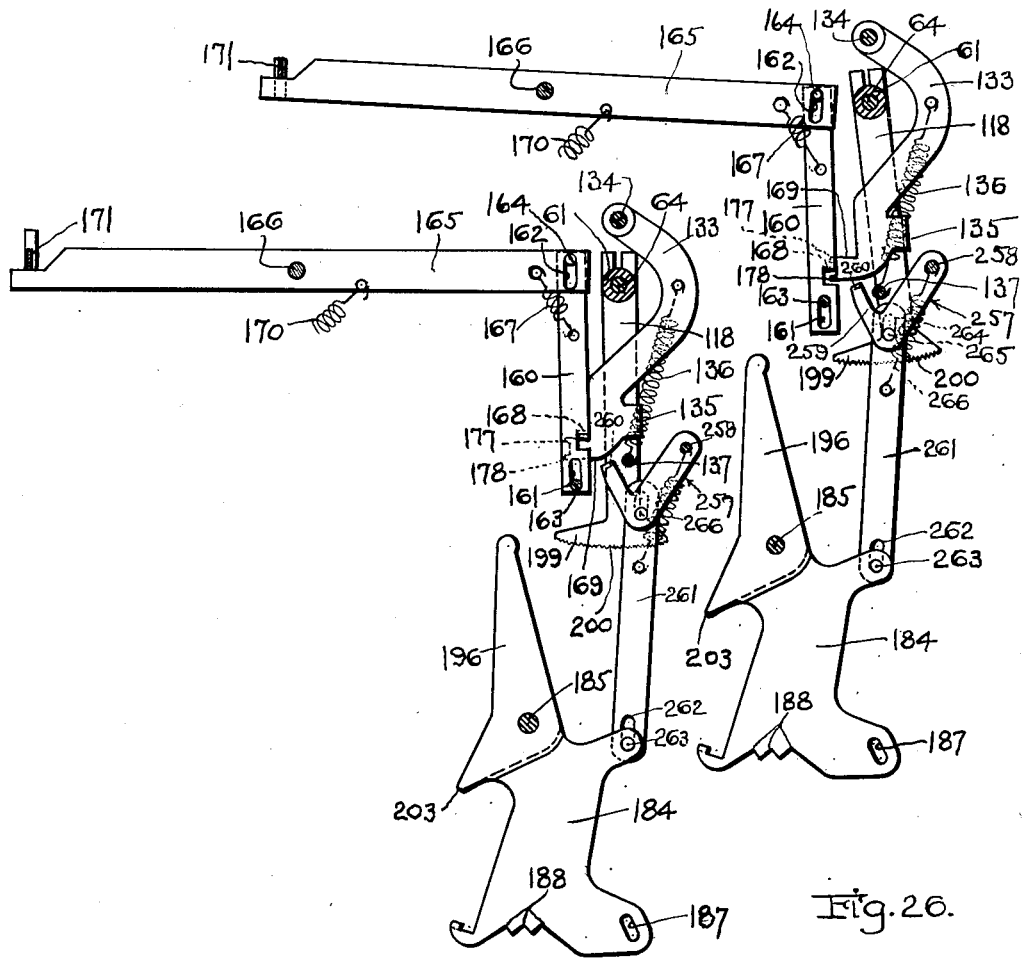
Fig. 26.
Fig. 27.

Aug. 14, 1951  S. A. STOLBERG  2,564,455
RECORD-CHANGER

Filed July 30, 1945  16 Sheets-Sheet 14

INVENTOR.
Sven A. Stolberg,
BY

Aug. 14, 1951 S. A. STOLBERG 2,564,455
RECORD-CHANGER
Filed July 30, 1945 16 Sheets-Sheet 15
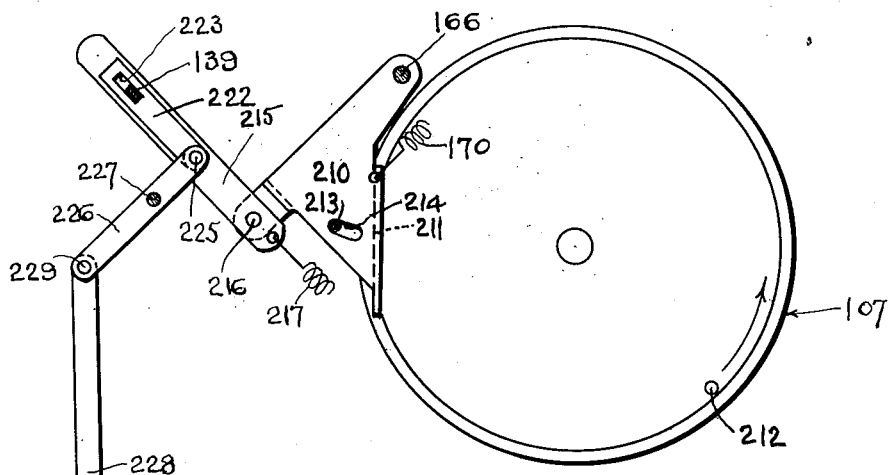
Fig. 30.
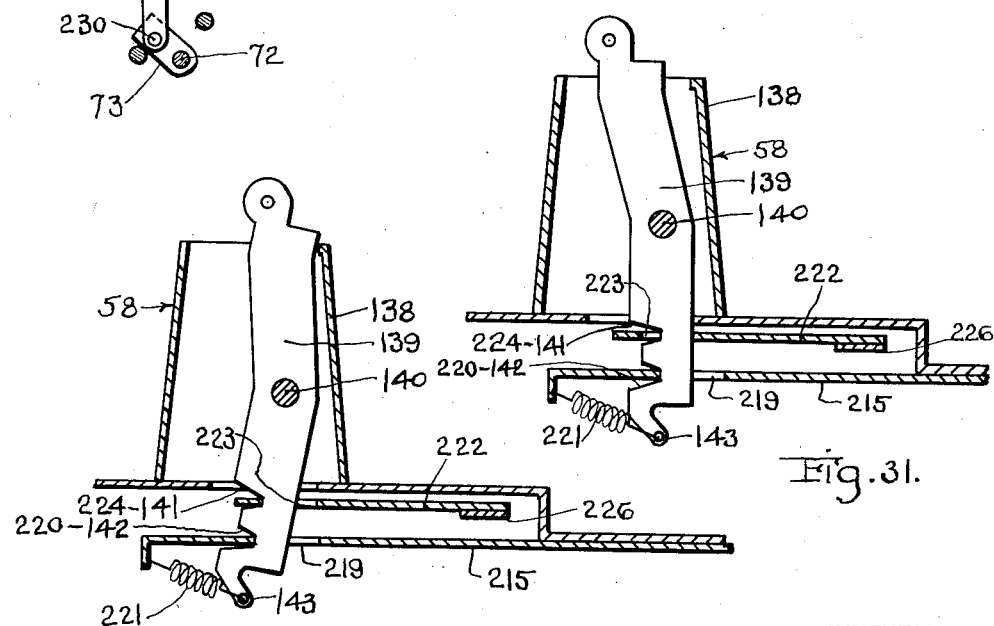
Fig. 32. Fig. 31.
INVENTOR.
Sven A. Stolberg,
BY
Atty.

Aug. 14, 1951  S. A. STOLBERG  2,564,455
RECORD-CHANGER
Filed July 30, 1945  16 Sheets-Sheet 16
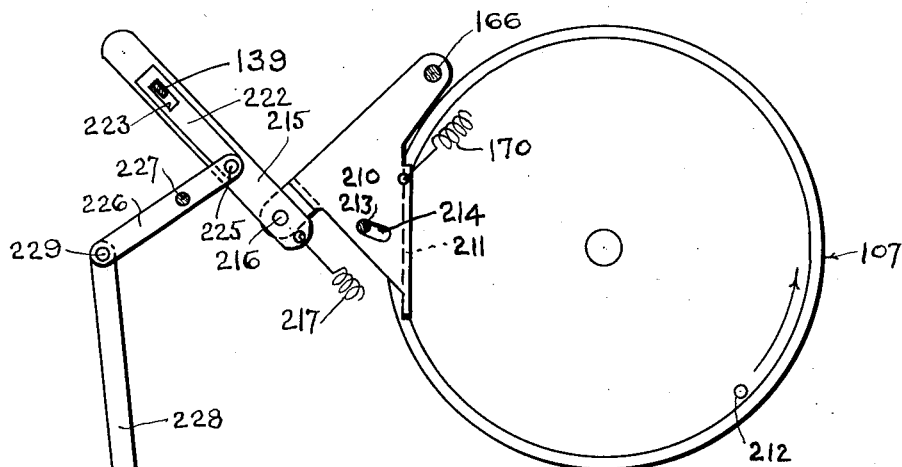
Fig. 33.
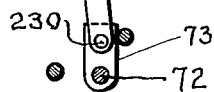
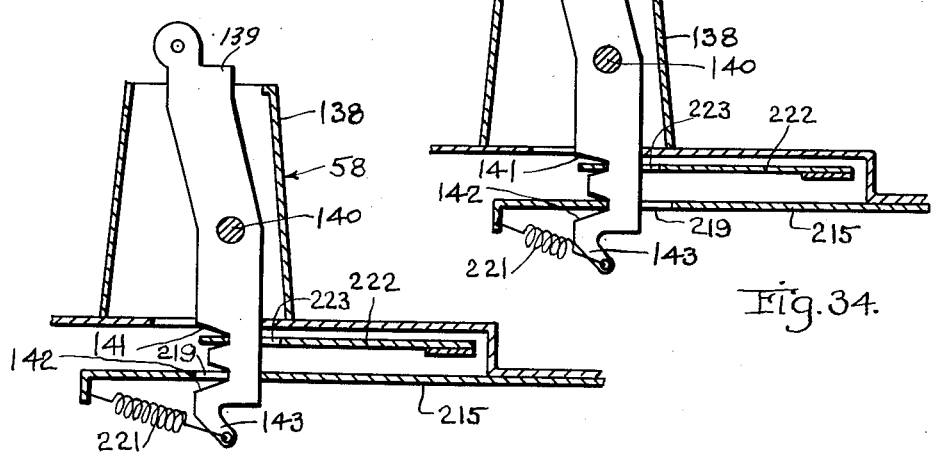
Fig. 35.  Fig. 34.
INVENTOR.
Sven A. Stolberg,
BY Tho. A. Lewing Jr.
Atty.

Patented Aug. 14, 1951

2,564,455

UNITED STATES PATENT OFFICE 2,564,455

RECORD CHANGER

Sven A. Stolberg, Chicago, Ill., assignor, by mesne assignments, to Raytheon Manufacturing Company, Newton, Mass., a corporation of Delaware Application July 30, 1945, Serial No. 607,878

11 Claims. (Cl. 274—10)

This invention relates to improvements in record-changers for sound reproduction. The record-changer herein disclosed in intended for reproduction of sounds from records of conventional form, and is devised to play each record in turn, thereafter placing each succeeding record into place on the turntable, resetting the tone-arm, and releasing said tone-arm to permit reproduction of the next record, etc. Devices of this general type are well known in the art. Furthermore, the record-changer herein disclosed is so arranged that it may be used for playing records of either of two standard sizes, such as ten inch and twelve inch records. The present record-changer is also provided with manually settable means whereby the device may be placed in a selected one of several conditions. Thus it may be set or brought into a "stop" position, wherein the motor is stopped by discontinuance of current supply thereto; or the device may be set or brought to a "manual" position, wherein the playing of each record is completely effected, but when each record has been completely played the device must be re-set to play the next record, which next record must be manually released to the playing position; or the device may be set or brought to an "automatic" position, wherein as each record is played and the playing thereof is completed, the device will then proceed automatically to release the next record of a series into playing position, the tone-arm being first swung to a position clear of the records already played and clear of the turntable, and the tone-arm being re-set into correct position and lowered into playing position after such next record has been released into playing position, after which the playing proceeds; or the device may be shifted to a "reject" position, wherein a record which has been released to playing position may be by-passed or not played, but the next record may be brought into playing position and played.

The present device is also provided with means whereby a selected record may be re-played or repeated as often as may be desired, without releasing the next record when playing of such selected record has been completed.

The present device is also provided with "stop" means whereby, when the last record present on the record carrier has been released to playing position, the device will be brought into condition such that upon completion of playing of such last record the running of the device will be automatically discontinued. This will ensure that excessive and unnecessary running of the device will be avoided, entirely without thought or manipulation on the part of the user.

It is evident that when a manual control is provided whereby the device may be set or brought into any one of several operating conditions such as just above described, the effective functioning of such manual control device should be properly synchronized or interlocked with the operating parts of the device so that improper interferences between parts will not be caused by premature manual operation or functioning. Thus, when the device has been functioning under "manual" control, a shift of the manual control lever to the "automatic" position, while being a possible movement, should not effect change of positions of certain operating parts of the mechanism until the record then being played has been completed. Thereupon, the various operating parts of the device should assume and retain their respective positions and relationships to enable "automatic" playing to proceed until the control element has been again re-set to some other position.

Likewise, provision should be made to ensure that when the device has been set and is operating for one size of records, for example, if the device has been set and is operating for a ten inch record, and if the control element is then re-set to the twelve inch record position, the various elements of the device should retain their proper positions and relationships to enable completion of playing of a ten inch record then in place, after which said elements should automatically shift to correct positions and relationships for twelve inch record playing. One object of the present invention is to provide suitable interlocks between various elements to ensure attainment of the foregoing operating condition.

It is also an object to provide suitable interlocks between suitable elements and operating parts to prevent movement of the mechanism from the ten inch to the twelve inch condition until the tone-arm has been shifted clear of the playing position; to prevent movement of the mechanism from the twelve inch to the ten inch condition until the tone-arm has been shifted clear of the playing position; to prevent stopping of the device, even when the "stop" element has been shifted to the stop position, until playing of a record then being played has been completed; to ensure release of the stop device following operation thereof so that when new or additional records are set into place on the record support said records may then be played; and to effect other desirable interlocking conditions and results as will appear in detail hereinafter.

The record supporting device herein disclosed is of that type in which the center holes of a series of records are set onto the center post, which center post is provided with a shoulder which supports the central portions of the records, the lowermost record of the series being released from such shoulder by a slight lateral shift of such lowermost record. Such lateral shifting is effected by suitable means adjacent to the edge of the lowermost record, and capable of engaging such edge of such lowermost record at the proper time to effect desired record release. Manifestly such edge engagement of such lowermost record must be effected properly according to the size of the record, whether ten or twelve inches in diameter. One feature of the present invention relates to the provision of a suitable supporting stand for the edge portions of the unplayed records, and which stand is provided with means to engage the edge of the lowermost record, to shift said record laterally for release to the playing position. It is an object of the present invention to provide such stand and such record edge engaging element in such form and arrangement that said parts may be set for engagement and playing of either of two sizes of records, for example, ten and twelve inch. In this connection, said stand and related parts are provided with a hinged or swingingly mounted plate which, when in one position, serves to engage the edge of a small sized record, for example, ten inch, at the proper time to effect feed; and which plate may be overturned to a position out of the way of the records, so that at such time and under such conditions another element may engage the edge of a larger sized record, for example, twelve inch, to effect feed of the same.

A further feature of the present invention relates to an interconnection between such swingingly mounted plate whereby when said plate is in its position for feed of the smaller sized records, the tone-arm positioning devices will be properly functioned and placed to ensure correct tone-arm setting for records of the size corresponding to feed by such plate; and said interconnection being so constituted that when said plate is swung over to the other position for permitting feed of larger sized records, the tone-arm positioning devices will function properly for tone-arm setting to the beginning position of such larger sized record. Thus, the setting of such swingingly mounted plate serves to automatically set the record feeding devices into desired position, and also serves to simultaneously set the tone-arm setting devices to correct positions and conditions for proper tone-arm setting for records of the selected size.

More particularly, it is an object of the invention to interconnect and interlock the foregoing elements in such manner that when such swingingly mounted plate is set into either position from its other position, the connections will not completely function until the tone-arm moves to a position clear of the records, whereupon said connections are permitted to complete their functioning and bring the tone-arm setting devices into the new position.

The record feeding devices herein disclosed include a rockable arm which is rocked on a transverse horizontal axis to effect record shift for record feed. Specifically the present devices include a tongue element which may be engaged by the upper end portion of such rockable arm for corresponding shift, such tongue element engaging the edge of the record when a small sized record is to be released. It is a further more specific object of the present invention to provide such tongue element and related parts of such form that when a larger sized record is to be fed said tongue and related parts may be swung over into the non-engaging position.

Since the record feed is effected by rocking of said rockable arm, which rocking is effected at the proper time in the record translating cycle, it is possible to provide for repeating or replaying of a record by merely preventing such arm from rocking in its normal manner.

I have also provided on said stand a swingingly mounted head element which is normally drawn down to bring suitable lugs or nubs into face engagement with the top face of the uppermost unplayed record supported by said stand. The down swing of this head element is limited by the elevation of such topmost record, but when the last or final record is released into playing position this head is allowed to fall to a considerably lower elevation than normal. Such condition exists only when the final record has been released. I have herein provided suitable interconnections between this head element and suitable stopping devices, so that when said head element is thus allowed to descend to the full extent corresponding to the absence of any record on the stand, such stopping devices are brought into position and condition to ensure stoppage of the machine when the playing of the last record has been completed.

In connection with the foregoing, I have also so arranged the parts that when such head element is subsequently raised, as is necessary to set records again on the supporting stand, such raising of the head element will automatically re-set the proper elements and connections into such positions that normal operations may be resumed without the need of special operations on the part of the operator of the machine.

Specifically, a further feature of the invention relates to the construction of the stand which supports the edge portions of the unplayed records; and relates to the elements contained in said stand to effect the desired connections for effecting proper tone-arm setting control, and to effect automatic stoppage of the turntable drive previously referred to herein.

Another object of the invention is to so arrange the structure and the various operating parts that said devices may be brought into a relatively small space or size, consistent with the sizes of the records to be translated. In this connection I have provided a supporting table or plate which serves as the principal support for the various operating parts; and I have provided such table or plate with a depressed or recessed portion into which the lower edge portion of the turntable seats, thus bringing the top face of the turntable to a lower elevation, and more nearly into planar alignment with the face of the table itself. I have then so arranged the various operating elements and connections that various of them may be arranged around the depressed portion of the table, thus accommodating said elements and connections within spaces which are present and without the need of providing increased vertical dimensions in the structure itself.

In connection with the foregoing, it is here noted that various of the manual control devices are located in corners of the device, the tone-arm pivot being in still another corner, and the record supporting stand in another corner. With this arrangement various of the required connections are effected directly from corner to corner, and by means of links or connections which lie at the sides of the depressed portion of the table.

Figure 8:
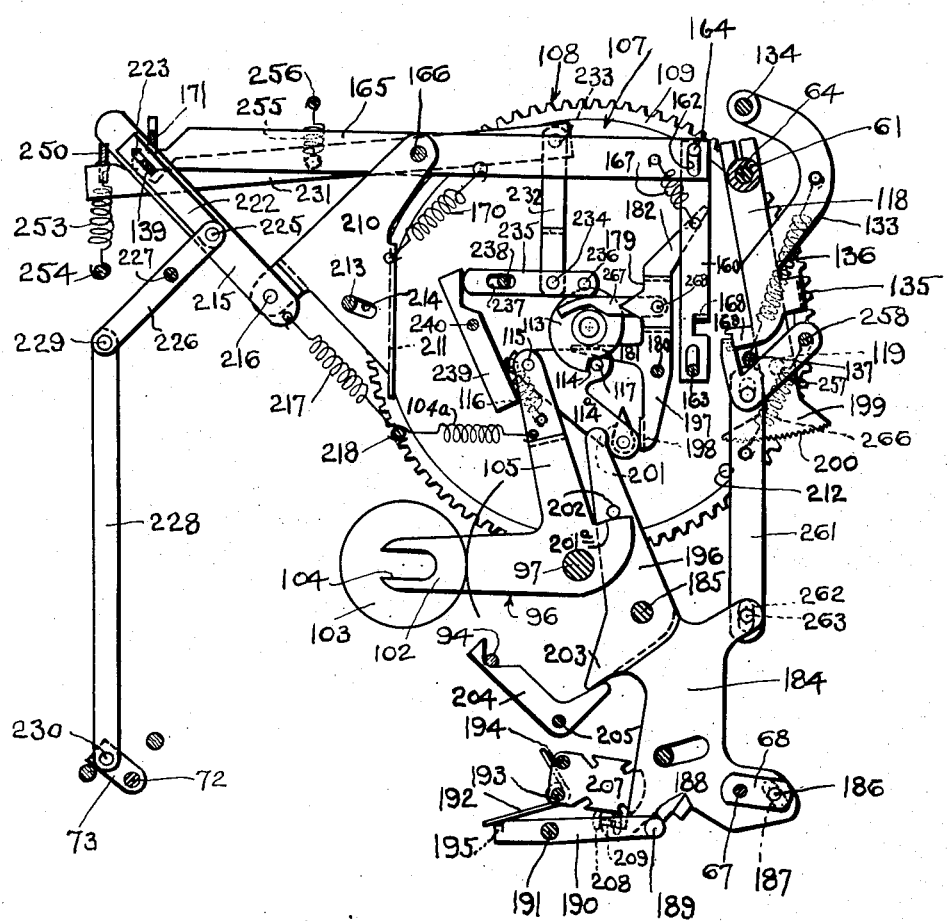
Figure 9:
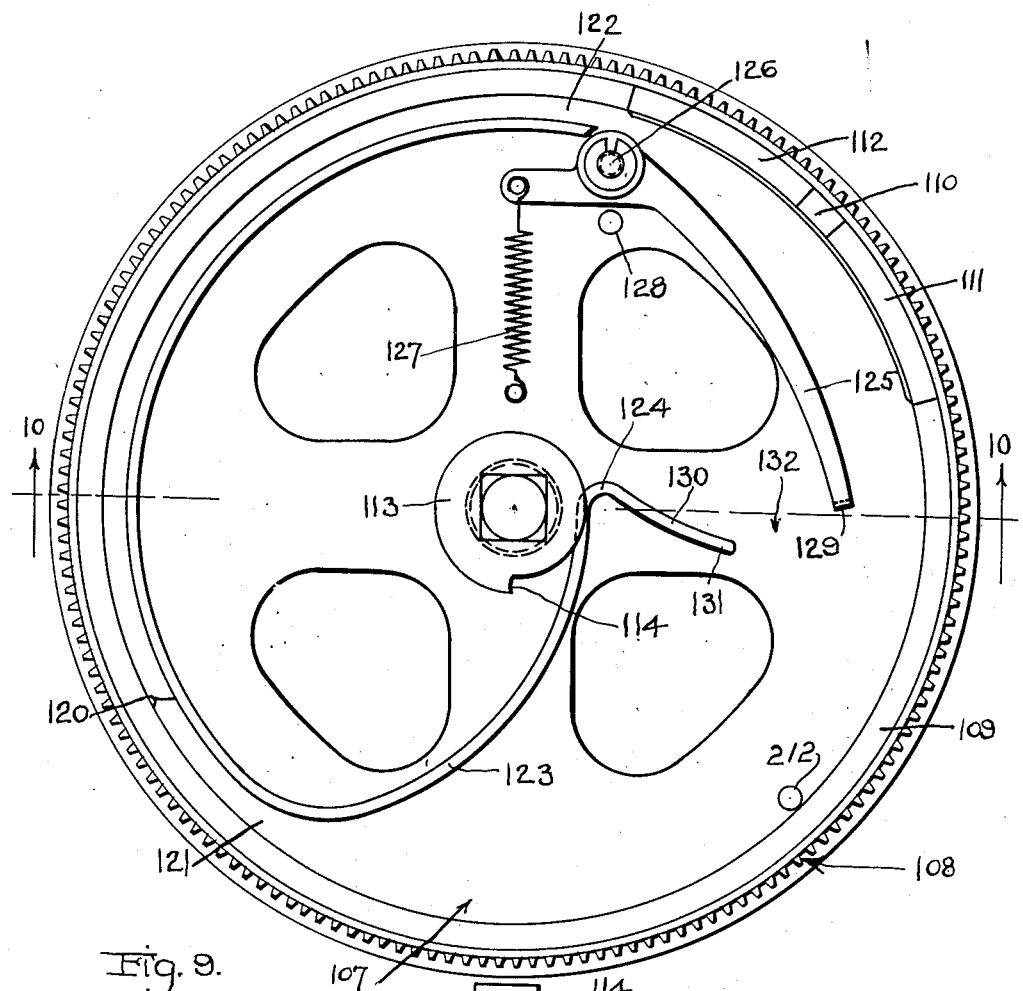
Figure 10:
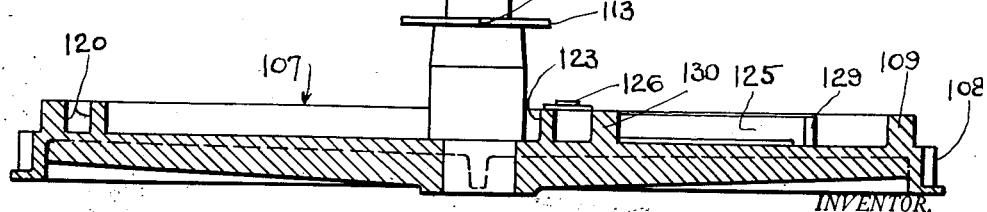
Figure 11:
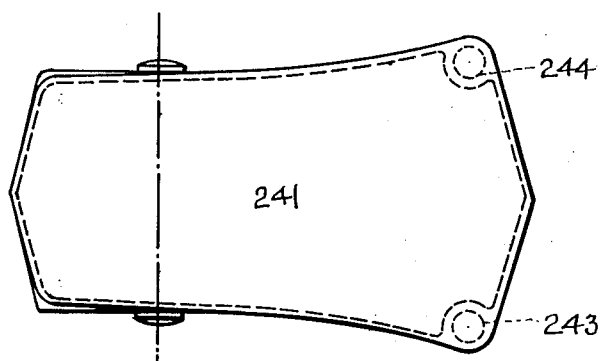
Figure 14:
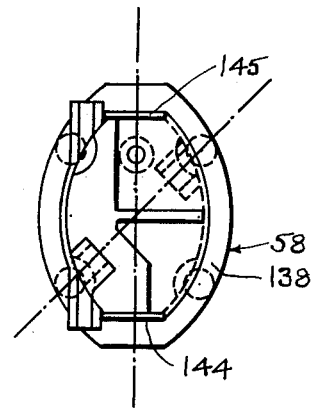
Figure 12:
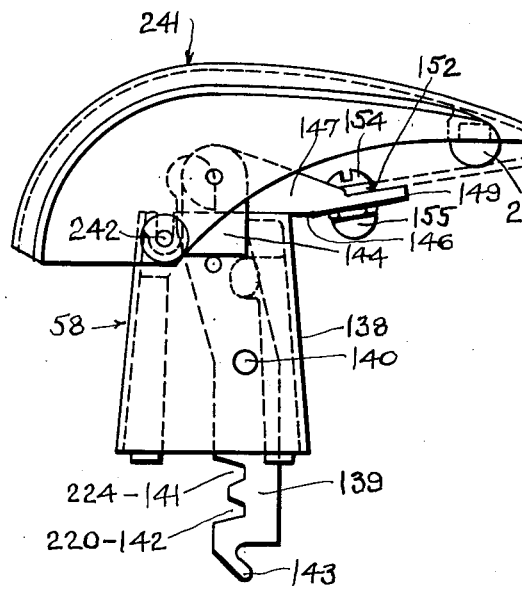
Figure 13:
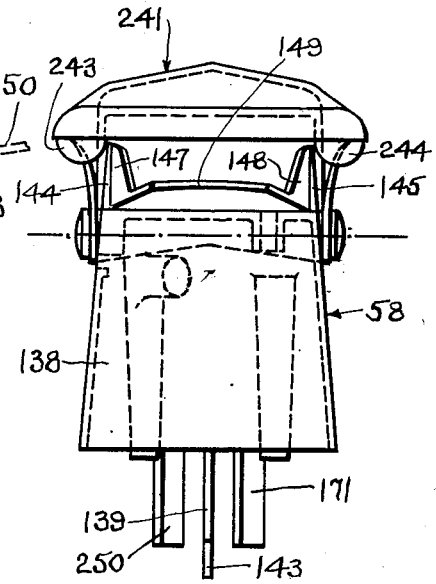
Figure 19:
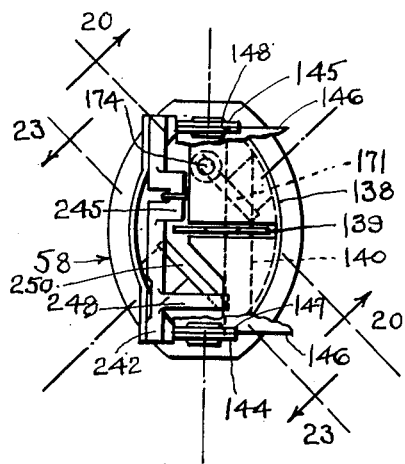
Figure 21:
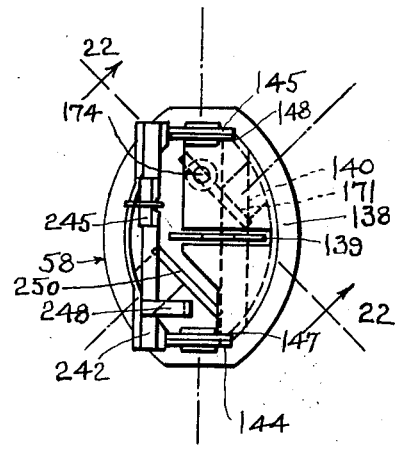
Figure 20:
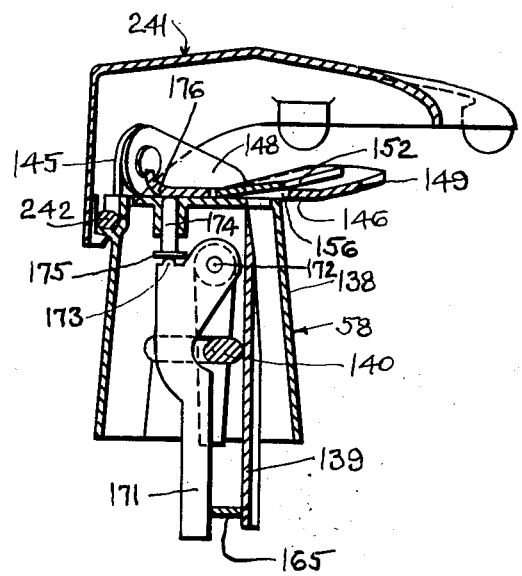
Figure 22:
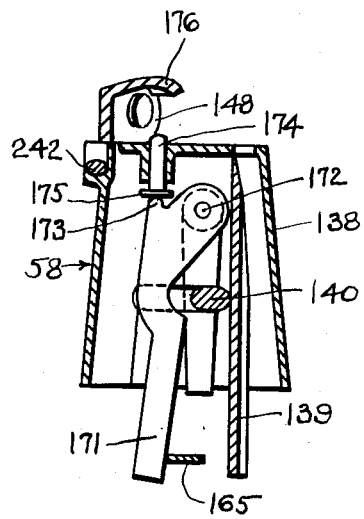
Figure 24:
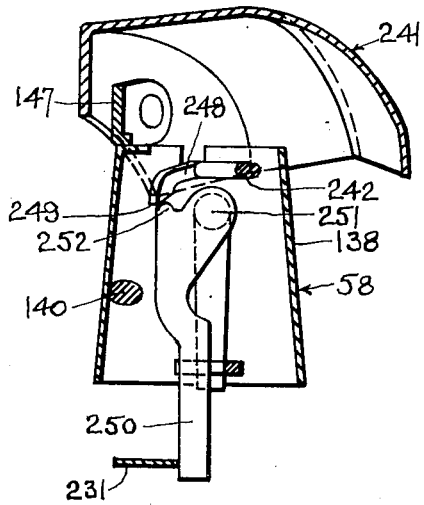
Figure 23:
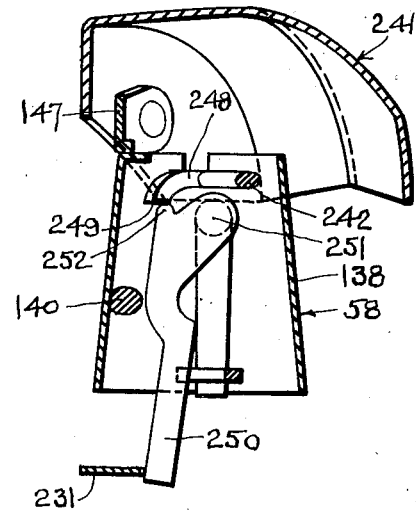
Figure 25:
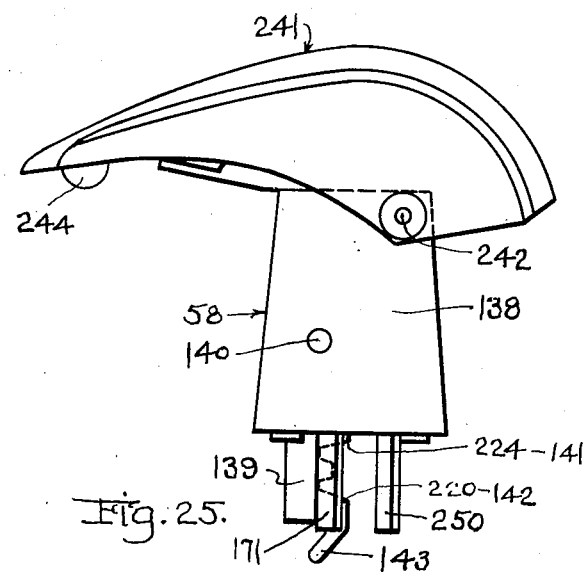
Figure 28:
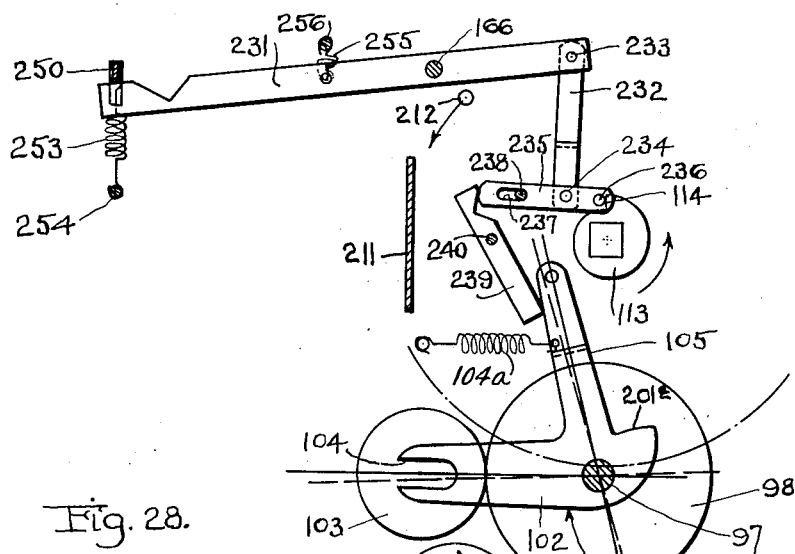
Figure 29:
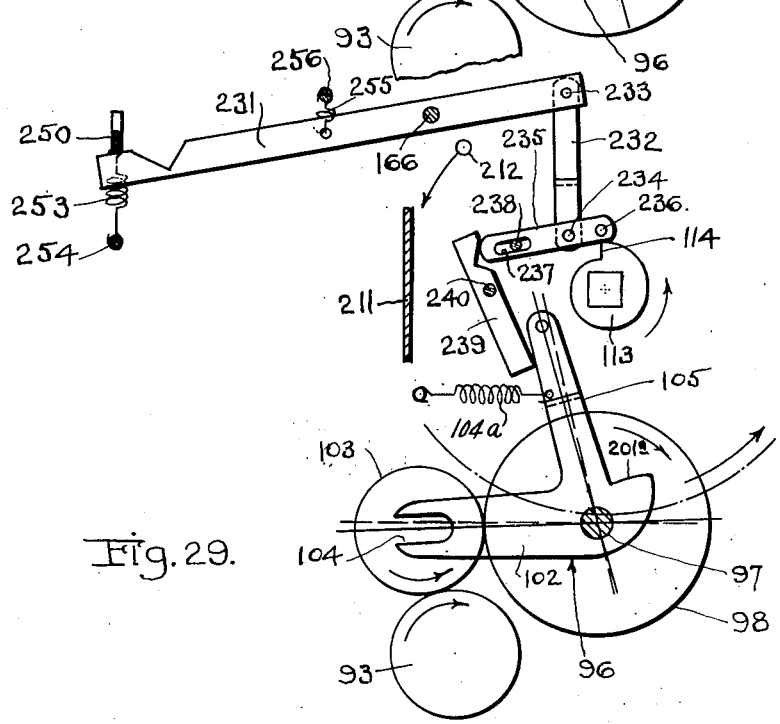

Figure 8 shows a plan view of the principal operating links and related parts, located generally below the table or support, said parts being shown in the following condition: manual control lever being in its "stop" position, tone-arm setter being locked against inward movement, and tone-arm being in corresponding position, tone-arm control being set to the small record position, automatic stop being set in position to effect stoppage of turntable drive, repeat mechanisms being set in their normal or non-repeat position, and one-cycle cam being in its initial or non-rotated position;

Figure 9 shows a plan view of the one-cycle cam, this figure being in full scale or large size;

Figure 10 shows a vertical transverse section taken on the line 10—10 of Figure 9, looking in the direction of the arrows;

Figure 11 shows a plan view of the stand head for the stand which supports the edge portions of the unplayed records;

Figure 12 shows a side elevation corresponding to Figure 11, the edge portion of a ten inch record being shown in place by broken lines, and the tongue element being shown in the ten inch record position, the stand head being shown in its normal or non-stopping position, since it is shown as being in engagement with the top face of the record;

Figure 13 shows a view at right angles to Figure 12;

Figure 14 shows a plan view of the stand proper, the head element being removed therefrom;

Figure 15 shows a horizontal section or view of the stand just above the tongue element, the stand head being in its horizontal or normal position, and the tongue element being in position to feed a small or ten inch record;

Figure 16 shows a vertical section taken on the line 16—16 of Figure 15, looking in the direction of the arrows;

Figure 17 shows a view similar to that of Figure 15, but with the head element turned back into the non-operating or non-record engaging position, and the tongue element being also turned back into the position which it occupies when large or twelve inch records are to be accommodated;

Figure 18 shows a vertical section on the line 18—18 of Figure 17, looking in the direction of the arrows;

Figure 19 shows a plan view of the stand element with the head portion removed therefrom, the tongue being in its small or ten inch record position (but broken away), and the head shaft being in its head horizontal or operating position;

Figure 20 shows a vertical section taken on the line 20—20 of Figure 19, looking in the direction of the arrows, showing in addition, the head in section, and this figure shows the lever which is functioned by the tongue to effect correct actuation of the connections which control placement of the tone-arm setter in its position for either ten or twelve inch records, said lever, in Figure 20, being in its position for setting the tone-arm setter to the ten inch position;

Figure 21 shows a view similar to that of Figure 19, but with the tone-arm controlling lever set to the twelve inch record position (the tongue element being raised and not shown in this figure), and in this figure the shaft for the head element is shown in the position which it occupies when said head is in raised or non-operative position, as when setting new records into place;

Figure 22 shows a vertical section taken on the line 22—22 of Figure 21, looking in the direction of the arrows, the tongue element being thrown back into the position it occupies when large or twelve inch records are in place, and the tone-arm control lever being similarly rocked into its position for placing the tone-arm setter to the twelve inch record position;

Figure 23 shows a vertical section taken on the line 23—23 of Figure 19, looking in the direction of the arrows, the stand head being in its horizontal or normal position, such as it occupies when one or more records is or are in position on the stand, and the stopping control lever being in corresponding position;

Figure 24 shows a view similar to that of Figure 23, but with the stand head lowered fully into the position which it occupies when no record is is place on the stand, being the stopping position, the stop control lever being in corresponding position;

Figure 25 shows a side elevation of the stand and head with the head in its lowered position such as it occupies when no record is in place, being the stopping control position;

Figure 26 shows the principal operating elements and connections for controlling the tone-arm setter for either the small record (ten inch) position or for the large record (twelve inch) position, the control being shown set for the twelve inch position, and with the interlock engaged with the linkage from the stand, being prior to or at commencement of playing of such twelve inch record;

Figure 27 shows a view similar to that of Figure 26, but with the parts in the small or ten inch record position;

Figure 28 shows the principal operating elements and connections for controlling the automatic stop mechanism, but with the one-cycle cam rotated over substantially one-half revolution, to the stopping position where the automatic stop devices have been engaged to effect stoppage prior to completion of the one-cycle rotation;

Figure 29 shows a view similar to that of Figure 28, but with the automatic stop elements released, as occurs when the stand head is raised to permit insertion of records into place on the stand, thus engaging the one-cycle cam drive to ensure that said one-cycle cam will be turned over to its initial or beginning position, such as it should occupy at the beginning of playing a new record;

Figure 30 shows the principal operating parts relating to the "repeat" mechanism, these parts being shown in their normal or non-repeat position;

Figure 31 shows a vertical section through the stand at a position adjacent to the rock arm which feeds the records, being at a position similar to the positions shown in Figures 16 and 18, and it shows the parts in the positions which they occupy when the repeat link is in its non-repeat position, and the record feed is in non-feeding position;

Figure 32 shows a view similar to that of Figure 31, but with the record feeding link in its record feeding position, the rock arm being tilted into its record feeding position;

Figure 33 shows a view similar to that of Figure 30, but with the "repeat" link shifted to the repeat position;

Figure 34 shows a view similar to that of Figures 31 and 32, but with the repeat link in its repeat position, and with the record feeding link in its normal or non-record feeding position; and Figure 35 shows a view similar to that of Figure 34, but with the record feeding link in its record feeding position, but in the case shown in Figure 35 the rock arm is not rocked and does not feed a record, since the repeat link is in the repeat position, thus locking the rock arm against record feeding rocking.

Figure 1:
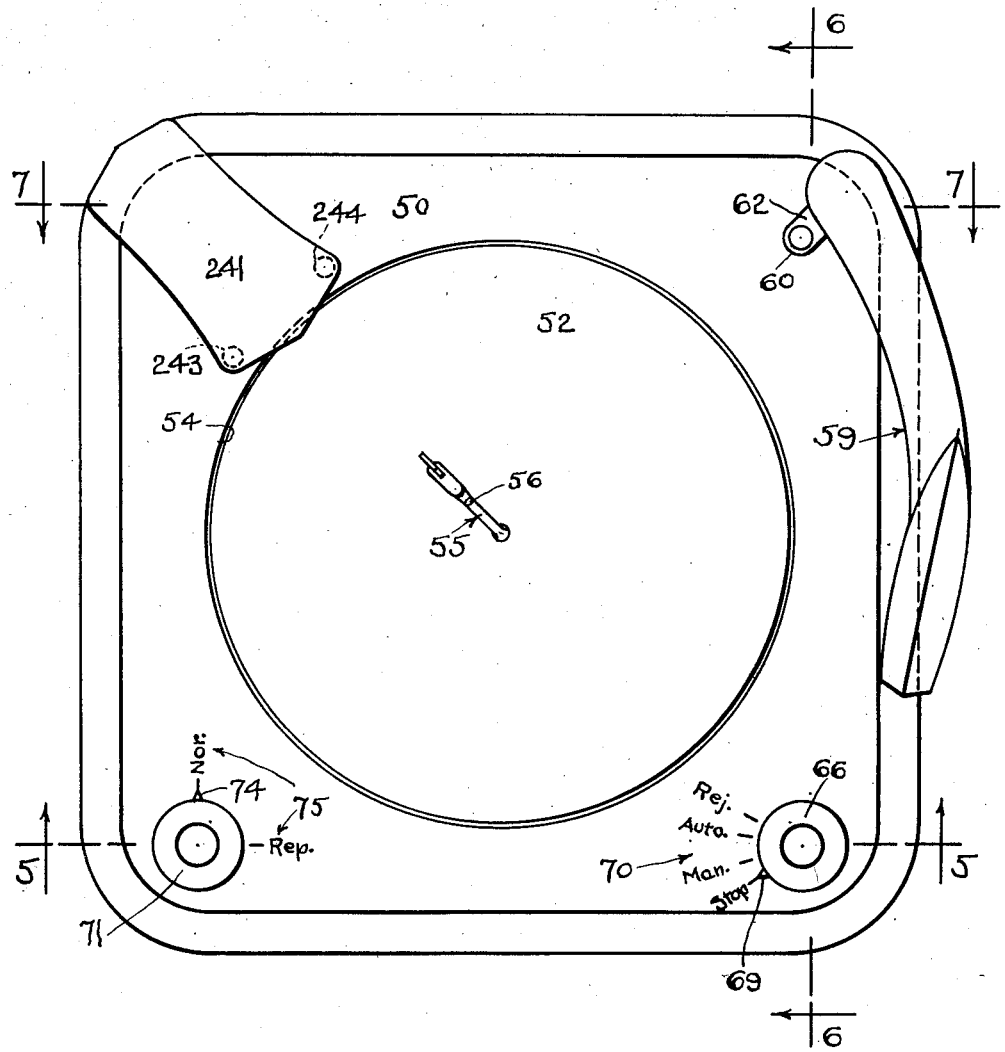
Figure 1 shows a plan view of a record-changing phonograph embodying the features of my present invention, the head of the stand being in its horizontal or normal position, and the tone-arm being swung over to the record clearing or extreme position.
Figure 2:
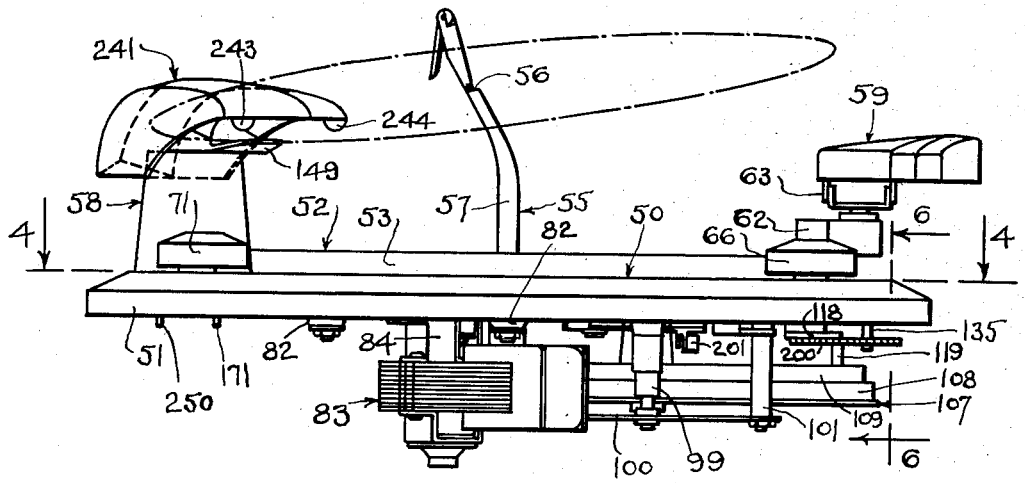
Figure 2 shows a front elevation of the device of Figure 1, and it shows the general position in which a small or ten inch record is supported previous to release into the playing position.
Figure 3:
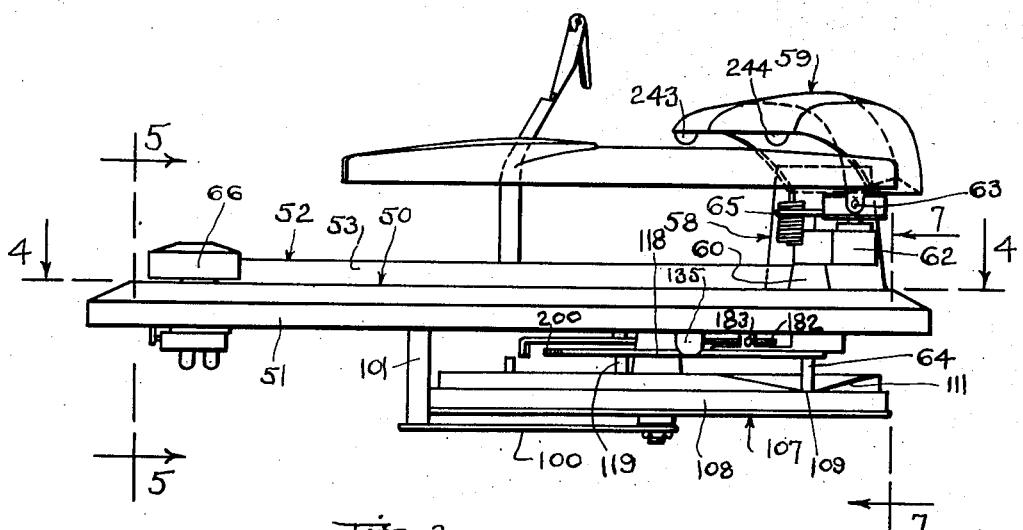
Figure 3 shows a right hand side elevation corresponding to Figures 1 and 2.
Figure 4:
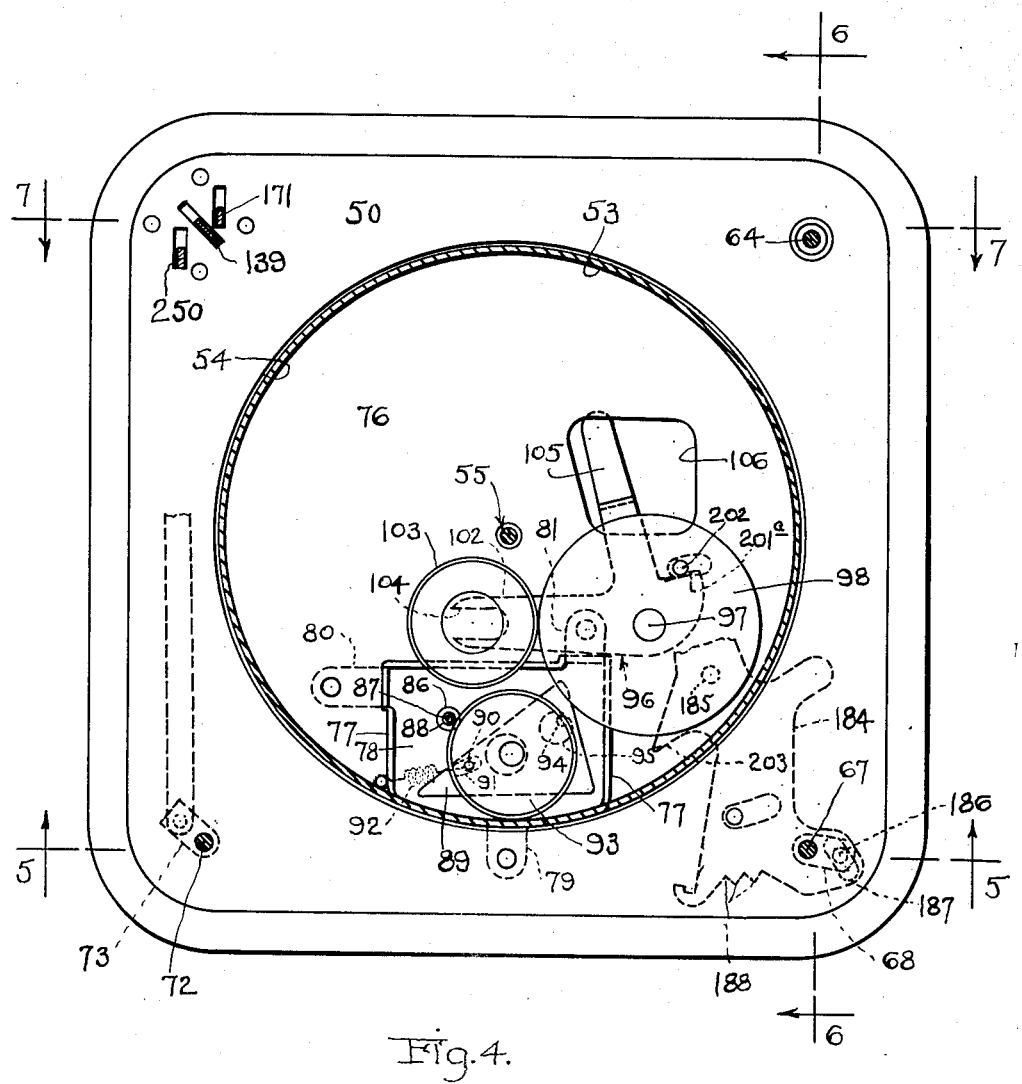
Figure 4 shows a horizontal or plan section taken at an elevation just above the table or support, being a section on the lines 4—4 of Figures 2, 3, 5, 6 and 7, looking in the directions of the arrows.
Figure 5:
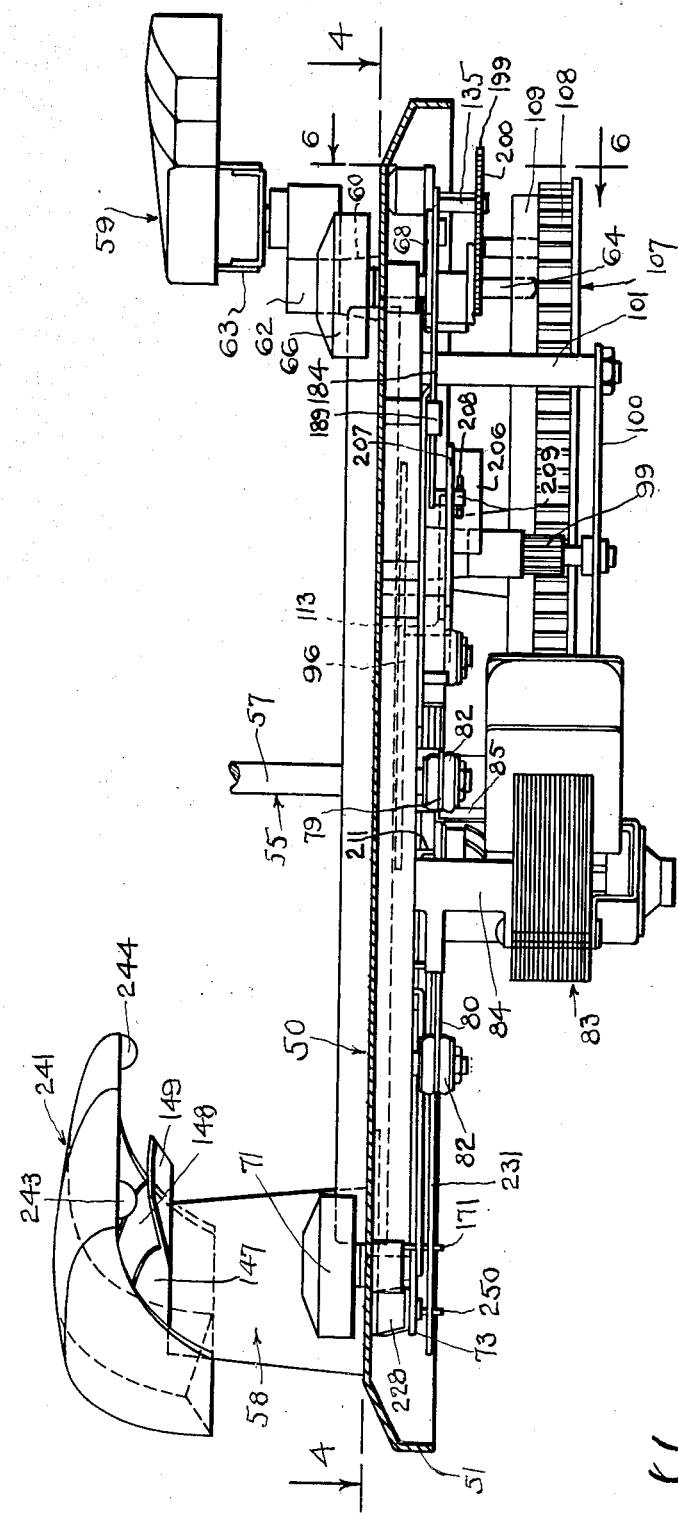
Figure 5 shows on enlarged scale, as compared to previous figures, a vertical section just behind the front edge of the table or support, being a section on the lines 5—5 of Figures 1, 3, 4 and 6, looking in the directions of the arrows.
Figure 6:
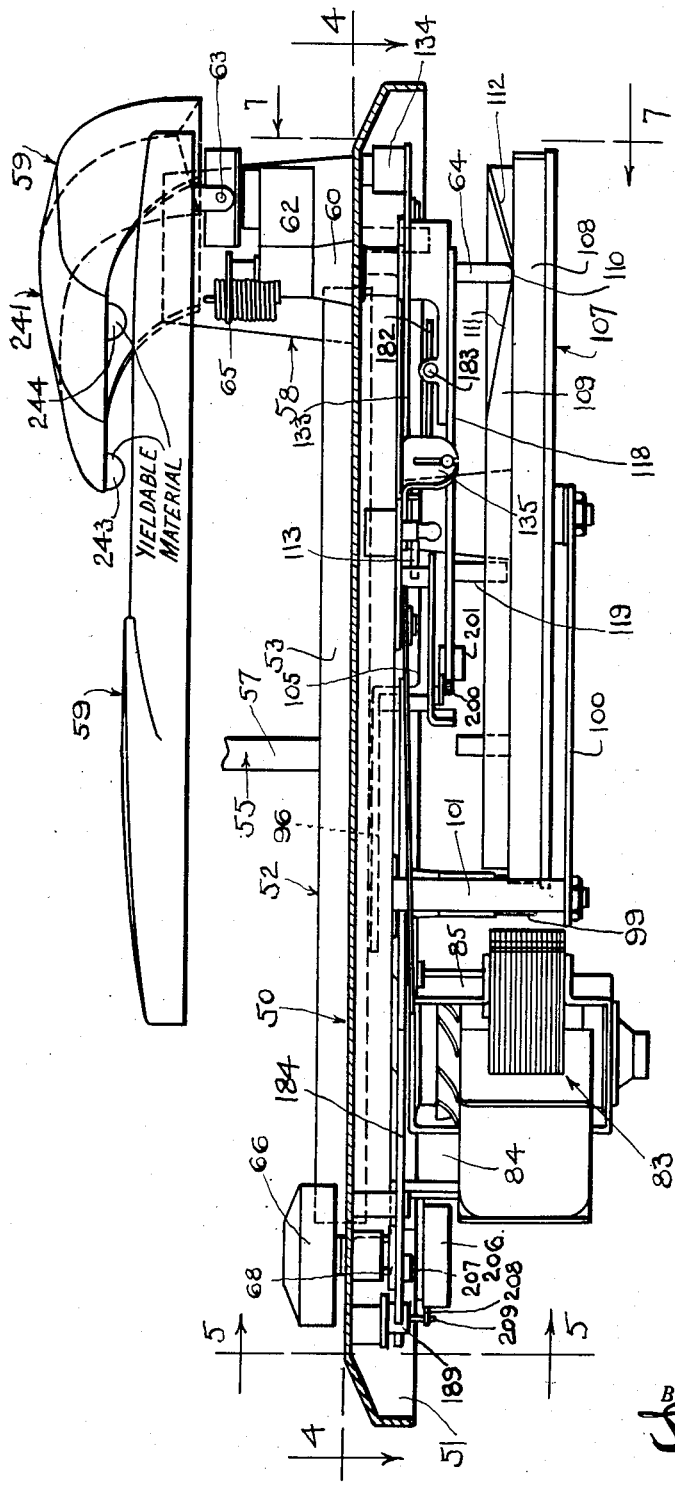
Figure 6 shows also on enlarged scale as compared to Figures 1 to 4, inclusive, a vertical section just inside of the right-hand edge of the table or support, being taken on the lines 6—6 of Figures 1, 2, 4, 5 and 7, looking in the directions of the arrows.
Figure 7:
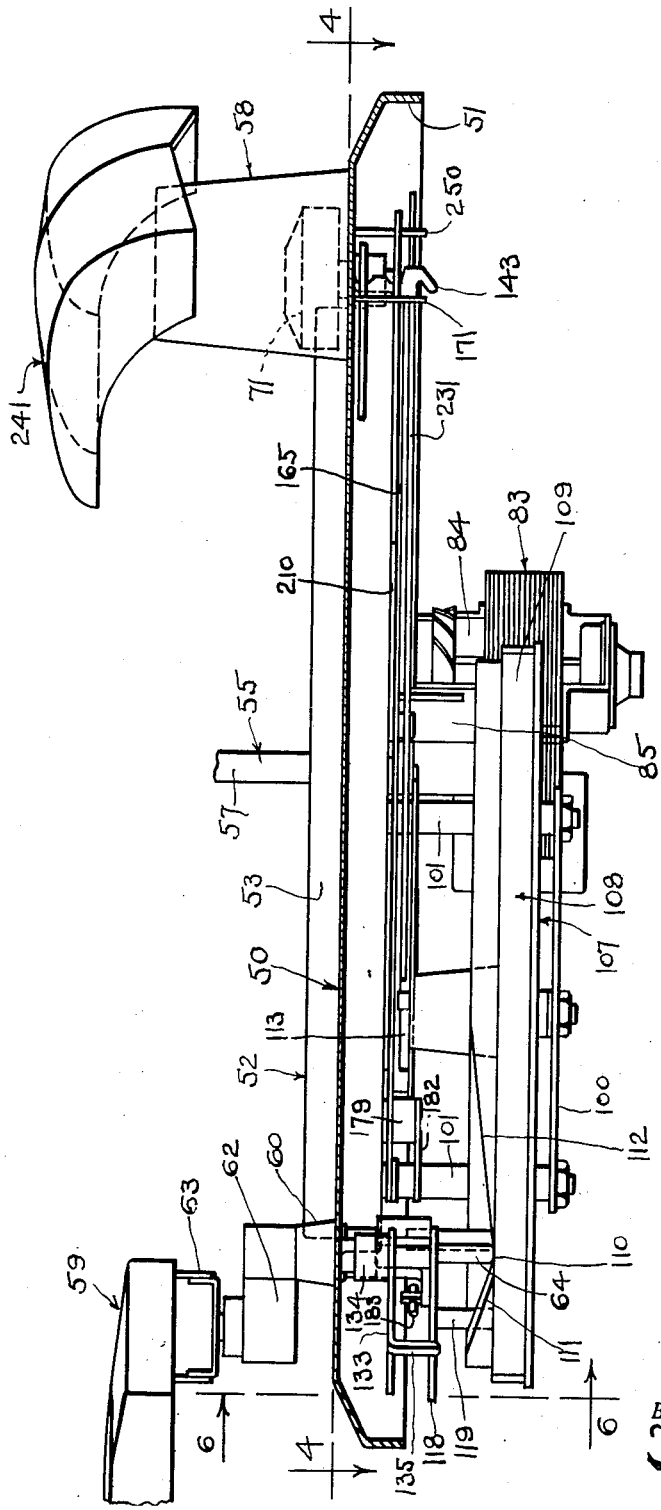
Figure 7 shows also on enlarged scale as compared to Figures 1 to 4, inclusive, a vertical section just inside of the rear edge of the table or support, being taken on the lines 7—7 of Figures 1, 3, 4 and 6, looking in the directions of the arrows.

It is here noted that Figures 9 to 25, inclusive, are substantially full size; that Figures 1 to 4, inclusive, 8, 26, 27, 28, 29, 30 and 33 are substantially half size; that Figures 31, 32, 34 and 35 are substantially full size; and that Figures 5, 6 and 7 are substantially four-fifths size, as compared to a typical record-changer capable of translating ten and twelve inch records of conventional form.

The record-changer herein disclosed includes the table or plate 50 which carries the principal operating parts of the device. This table is conveniently made of generally rectangular form, with its edge portion flanged downwardly as shown at 51 to provide additional stiffness, and to provide a semi-enclosure for various parts which are located beneath said table.

The turntable 52 is suitably journalled centrally of the table 50, the details of such journal not being shown. It is noted that said turntable is preferably flanged around its periphery, the flange 53 thereof reaching down and providing additional stiffness to the turntable in accordance with good practice. In order to enable this turntable to be set at lower elevation with respect to the top surface of the table 50, while at the same time providing for accommodation of the depth of the turntable and making provision for accommodation of certain parts beneath the turntable and above the top surface of the table 50, I have shown said table 50 as being provided with the circular depression 54 of slightly larger diameter than the turntable itself so that the flange 53 of the turntable may set down into such recess with clearance, and at the same time make the proper accommodations already mentioned. It is noted that such depression 54 also lowers the bottom face of the central portion of the table 50 by equal amount, but inasmuch as certain connections between corner elements of the mechanism may be effected along the edge portions of the device, said connections may be effected along that portion of the table 50 which lies to the outside of the depression, and where the table 50 is not depressed.

There is provided the central post 55 which is concentric with the turntable and reaches up substantially above the top surface of the turntable as well shown in various figures. This post is shouldered at the point 56 substantially above the turntable; and the post is so formed that a stack of unplayed records may be set down over this post from above, and without the need of removing the post from its support in or adjacent to the table 50. This post is also so formed that by a slight lateral displacement of the lowermost record of such stack, such lowermost record may be released from the support of the shoulder 56 and permitted to drop down onto the surface of the turntable or onto the topmost record of a series of records previously released onto the turntable. In so doing only the lowermost record of such stack of unplayed records is released, by an escapement operation, the higher records of such stack being held in place on the post, and the lowermost one of such remaining records being then held on the shoulder 56. Schemes of the foregoing general type are well known in this art, and it is not necessary to further describe the details of the post construction herein shown. I will mention, however, that the post herein shown is itself deflected laterally in the direction radially opposite to the location of the shoulder, so that the portion of the post at and above such shoulder lies considerably to one side of the center of the turntable, being substantially to that side which is opposite to the shoulder location. Thus, as each record is released by such slight lateral displacement, such record is carried down over the post to the surface of the turntable, or onto the topmost record previously released, and such descending record finds itself concentric with the turntable when it comes to rest. In order to accommodate a number of records in a stack on the turntable, with the condition that all such records shall themselves be concentric with the turntable, the post 55 is formed with a substantial section thereof, 57, straight and concentric with the turntable, the deflection of the post laterally occurring above such straight portion as well shown in Figures 1, 2 and 3. This straight portion 57 is of sufficient height to accommodate the desired number of played records on the turntable, and the current unplayed record, all concentric with the turntable, so that proper functioning of the tone-arm when playing all such records will be ensured, as will presently appear.

The center post serves to support the central portions of the unplayed records, but it is desirable to also support the edge portions of such records, and is necessary to make provision for effecting the lateral shift of the lowermost record for record feed. To these ends I have provided the stand 58 which is in substantial radial alignment with the plane in which the center post lies. This stand not only supports the edge portions of the records, but also includes the record edge displacing means, and the stand head whereby the automatic stop mechanism is controlled. The details of this stand will be described hereinafter. Conveniently the offset portion of the center post lies in a plane passing through the rear left hand corner of the table 50, and the stand 58 is placed in said rear left hand corner of the table.

The tone-arm 59 is pivotally mounted to rock about a vertical axis which extends through the right hand rear corner of the table 50. For this purpose there is provided a stand 60 mounted on said corner of the table, the tubular shaft 61 (see Figures 8, 26 and 27) extending up through and being journalled in said stand 60. A bracket 62 is secured to the upper end portion of this tubulart shaft 61, the tone-arm proper being carried by this bracket 62 on a horizontal transversely extending journal 63. By this means the tone-arm may be swung about a vertical axis (being the tubular shaft 61) for translation of the sound track, and for the various tone-arm movements required, and also the tone-arm may be raised when necessary to lift the stylus from the record, as during out-swing of the tone-arm at completion of a record playing operation. These several movements are well understood in this art.

Extending up through the tubular shaft 61 is the vertical pin 64. The upper end of this pin supports the bracket arm 65 which is in turn connected to the tone-arm journal 63 in such way that, upon raising the pin 64, the tone-arm is raised by rocking on the horizontal axis 63, and conversely, by permitting the pin to lower, the tone-arm is again permitted to rock down to bring the stylus into engagement with the record sound track. The details of this bracket construction do not require further description here, as devices of this general arrangement are well known in this art at the present time.

It will now be seen that complete tone-arm control may be effected by rocking the tubular shaft 61 (to effect lateral swings of the tone-arm), and by raising or permitting to fall the pin 64 (to effect raising or lowering of the tone-arm). The means whereby these controls are effected will be disclosed hereinafter.

On the lower right-hand corner of the table 50 there is journalled the control button 66. This button is carried by a short rock shaft 67 which extends down through the table and carries the short arm 68 at its lower end. This button and shaft serve, through the means to be presently described, to control setting of the various mechanisms to ensure either "stop" of the machine, or to give either "manual" control or "automatic" control, or to effect "reject" of a record. Said button is shown as having the pointer 69 which may be compared to the several markings shown at 70 on the face of the table 50. The details of the various connections to this control button will be presently described hereinafter.

On the lower left-hand corner of the table 50 there is journalled the control button 71. This button is carried by a short rock shaft 72 which extends down through the table and carries the short arm 73 at its lower end. This button and shaft serve, through the means to be presently described, to control setting of the various mechanisms to give either normal operation of the record-changing devices, so as to release a new record to descend onto the turntable or onto the played records supported by the turntable, or to give "repeat" operation, wherein the record then in place may be successively played as long as the button remains in the "repeat" position. Said button is shown as having the pointer 74 which may be compared to the markings 75 on the face of the table. The details of the various connections to this control button will be presently described hereinafter.

The floor 76 of the depressed portion 54 of the table is provided with a substantially rectangular opening 77 (see Figure 4), which opening is located directly in front of the axis on which the turntable rotates. The plate 78, slightly smaller than this opening 77, is located in said opening, but clears the table proper, so as not to transmit vibrations to the table. This plate 78 is provided with the three arms 79, 80 and 81, which reach out from said plate and are formed downwardly as well shown in Figure 5, said arms thus reaching to positions beneath the table, while the body proper of the plate lies in substantial planar alignment with the depressed portion of the floor of the table 50. These arms 79, 80 and 81 are connected to the table by the rubber or other cushioning connections such as 82, so that vibrations due to motor running will not be communicated to the table and other parts.

The motor 83 is carried by the plate 78. This is effected by the two arms or brackets 84 and 85 which are suitably connected to the plate and to the motor respectively. The plate 78 is provided with an opening 86 through which extends the motor shaft 87 or an extension of said shaft; and a small drive pinion or friction roller 88 is carried by the upper end of said motor shaft and above the surface of the plate 78. Slidably mounted on the plate 78 is the triangular plate 89 whose corners are deflected down slightly so as to ride directly on the surface of the plate 78. A pin 90 reaches down from the plate 89 through a slot 91 of the plate 78, and a spring 92 is connected to the lower end of said pin and to a stationary part. This spring therefore draws the triangular plate laterally towards the left as seen in Figure 4. An idler wheel 93 is journalled on this triangular plate and is of such size and so located that when the triangular plate 89 is drawn sidewise by the spring 92 said idler wheel will engage both the motor pinion or friction roller 88 and the inside face of the turntable flange, thus effecting drive from the motor to the turntable. This drive, according to conventional practice, effects drive of the turntable clockwise when viewed from above.

By shifting the triangular plate 89 laterally against the force of the spring 92 it is possible to carry the idler wheel 93 from engagement with the motor pinion and the turntable flange, thus discontinuing the turntable drive. To this end I have provided a pin 94 which reaches from the triangular plate 89 downwardly through an opening 95 of the plate 78 to a position beneath said plate 78 where said pin 94 may be controlled from time to time.

A bell crank 96 is journalled to the floor of the depressed portion of the table at the point 97. Such journalling is effected by setting said bell crank on a shaft (97). This shaft in turn is journalled through the floor of the depression; and the upper end of this shaft carries the friction idler wheel 98, the lower end of the shaft carrying the cam drive pinion 99. The lower end of this shaft may also be journalled in a plate 100 which is carried by the floor of the depressed portion of the table, such connection being effected by several vertical posts such as 101 (see Figures 5, 6 and 7).

Examination of Figure 4 shows that the friction idler wheel 98 does not directly engage the turntable flange; but the arm 102 of the bell crank 96 carries another idler wheel 103, journalled to said arm by a short stud set onto said arm by a radial adjustment connection including the radial slot 104 so that the position of the idler wheel 103 radially along the arm 102 and with respect to the shaft 97 may be adjusted. Thus it is possible to bring the idler wheel 103 into engagement with the wheel 98, and under such contact pressure as may be desired to ensure sufficient drive pressure. Still the bell crank may be rocked about the shaft 97 while such engagement between the wheels 98 and 103 continues. By rocking the bell crank slightly in a counterclockwise direction from the position shown in Figure 4, the wheel 103 may be brought into frictional drive connection with the wheel 93, thus effecting drive to the wheel 103, and since said wheel 103 is at all times in driving connection with the wheel 98, said wheel 98 and the shaft 97 and the pinion 99 will then be driven from the motor. Under these conditions the pinion and turntable will both be driven by the motor. A spring 104a connected to the arm 105 of the bell crank tends to retain such driving connection between the wheels 103 and 93, but by forcing the bell crank to rock in a clockwise direction against the force of this spring, such driving connection is discontinued. This spring 104a is of sufficient strength to effect drive of the shaft 97 and pinion 99 for one-cycle cam drive.

The arm 105 of the bell crank is deflected downwardly and reaches through an opening 106 in the floor of the table depression so that the free end of this arm 105 lies and rocks beneath said depression floor.

Journalled to the plate 100 or other suitable part is the one-cycle cam element 107. This is shown in detail in Figures 9 and 10. It is circular in form, being provided with the edge or ring gear 108 which is engaged by the pinion 99 at all times. This cam element also is provided with the annular flange element 109 which lies directly beneath the pin or stud 64 whereby the raising and lowering of the tone-arm is effected. This flange 109 comprises a cam element acting vertically, and said flange is provided with a depressed portion 110 of short angular embracement, so that when said depressed portion reaches the position of the pin 64 said pin is permitted to lower, thus lowering the tone-arm and allowing the stylus to engage with the sound track of the record in place for translation. The extent of such descent will depend on the elevation at which the stylus engages the sound track, and thus the device is able to accommodate itself to various elevations according to the number of records which may at the time be carried by the turntable. With the exception of the depressed portion 110 and the leading and following gradients 111 and 112 which lead to and from said depressed portion, the flange 109 is of full elevation throughout the circle. The normal or stopped position of the cam element is that in which the pin 64 lies at the bottom of the depression 110, since the one-cycle cam remains stationary during playing or translation of the record sound track.

It is here noted that means must be provided for controlling the engagement and disengagement of the friction wheel 103 with the friction wheel 93, since it is desired to rotate the one-cycle cam only under certain conditions, said cam remaining idle at other times. Included in such controlling elements is a bell crank release cam element 113 having the shoulder 114 which faces in the direction of cam rotation, that is, faces counterclockwise. The free end of the bell crank arm 105 carries a rock element or trigger 114a pivoted at the point 115 and normally rocked counterclockwise with respect to the arm 105 by means of the spring 116. This trigger 114a has the pin 117 which will be engaged by the shoulder 114 as the one-cycle cam completes its cycle of rotation, thus drawing the bell crank arm 105 towards the right when viewed from above and thus shifting the idler wheel 103 away from the wheel 93 and discontinuing cam drive at completion of the cycle. When it is desired to again perform a cycle of cam movements, this may be done by merely rocking the trigger 114a sufficiently in a clockwise direction to release its pin 117 from the shoulder, whereupon the spring 104a will rock the bell crank arm 105 counterclockwise and re-engage the wheels 103 and 93, thus initiating a new cycle of movements. The means to control such movements of the trigger will be described hereinafter.

The one-cycle cam also serves to control and effect the out swing of the tone-arm at completion of a record playing operation, and to permit resetting of the tone-arm into correct position over the newly placed record, according to the size of said record, whether large (twelve inch) or small (ten inch). To this end I have provided a tone-arm setter, together with means to control said setter and also means to actuate said setter by one-cycle cam operation. These devices I shall now describe.

To the lower end of the tubular shaft 61 which effects lateral swing of the tone-arm there is connected a cam follower arm 118. This arm 118 reaches forwardly over the one-cycle cam, and there is a cam follower pin 119 extending downwardly from this arm 118 for suitable engagement with the cam track of the cam. The one-cycle cam has the general form shown in Figures 9 and 10. In Figure 9 said cam is shown in its rest or normal position. It is provided with the cam track 120 which commences at the point 121 and extends around for about 135 degrees to the point 122. In advance of the beginning end 121 the inner wall 123 of this cam track curves from the point 124 close to the axis of rotation, outwardly to said beginning end 121, so that engagement of the cam follower pin 119 with said curving wall will serve to rock the tone-arm lever 118 outwardly to carry the tone-arm clear out beyond the position of the played record (of large size), or clear of such large sized record. Such condition is then retained until the one-cycle cam has rotated far enough to bring its cam track portion 122 around to the cam follower pin 119 which is still being held at its position of extreme outward swing. When the above position of the cam has been reached the cam follower pin 119 is released from engagement with the cam track proper.

There is a restraining lever 125 carried by the one-cycle cam on a pivotal connection 126, a spring 127 serving to retain this lever normally in the position shown in Figure 9 or slightly outward of said position, so that said lever engages a stop pin 128. This lever 125 is of such length that its free end 129 lies just beyond the position which the tone-arm lever cam follower pin 119 occupies when the one-cycle cam completes its cycle of movements. In other words, just before the one-cycle cam completes its cycle of rotation, this arm 125 rides free of the cam follower pin 119, thus discontinuing any co-action between these parts. Then the cam follower pin 119 is free to move as may be otherwise dictated. It is here noted, however, that the spring 127 is not strong enough to prevent tone-arm setting by means not yet described, but said spring 127 serves to control and dampen the tone-arm setting operations which will be presently described in detail.

It is here noted that the inner end portion of the wall 123 terminates in an outwardly curved portion 130, which, however, terminates at the point 131 such as to provide a space or clearance 132 between said inner end of the wall and the free end 129 of the restraining arm 125 under all positions of said arm 125. Thus, in case the one-cycle cam should be forced backwardly by some unusual means or force, the cam follower pin 119 may ride through said space and without damaging the device.

Now it is noted that once the cam follower pin 119 is free of the cam track and restraining lever 125, the tone-arm lever arm 118 and cam follower pin 119 are free to move back and forth. In fact such movements may occur as soon as the cam track point 122 has been reached, but restraint will be effected by the restraining lever 125 until said lever is also completely cleared from the cam follower pin 119. It is also noted that means must be provided for setting the tone-arm to either the larger or smaller record position according to the size of the record which is then in place ready to be played. In the case of a small or ten inch record the tone-arm and the cam follower pin 119 must be set inwardly farther than is the case when a large or twelve inch record is in place. I have therefore provided a tone-arm setter arrangement which I shall now describe in detail:

A tone-arm setter is provided in the form of a lever 133 which is pivoted to the bottom face of the table at the point 134. This pivotal point is preferably directly behind the vertical axis on which the tone-arm proper is journalled. This tone-arm setter includes an arm having the downwardly extending lug 135 at its outer edge, said lug being adapted to engage the tone-arm lever 118 as the setter is swung inwardly, thus also swinging the tone arm lever and tone arm proper inwardly towards the small record position. A spring 136 has one end connected to the tone-arm setter and its other end connected to a stud 137 carried by the table; and said spring tends at all times to swing the setter inwardly to carry the tone-arm lever 118 with it, this spring being strong enough to overcome the resistance offered by the spring 127 on the one-cycle cam, and which spring 127 acts on the restraining lever 125 of the one-cycle cam. It is noted that as the one-cycle cam rotates past the position where the cam track definitely engages the cam follower pin 119, being the position 122, so that the restraining lever 125 comes into engagement with the cam follower pin 119, the mechanical advantage exerted by the spring 127 decreases progressively until a time is reached when the spring 136 is able to overpower the effect of the spring 127, whereupon the tone-arm setter will shift the tone-arm lever inwardly (to smaller radius positions as referred to the record in place on the turntable), and such inward shift of the tone-arm will continue until some other restraining influence comes into play to stop the movement. It is also noted that at any position of the tone-arm setter the tone-arm proper is free to be moved inwardly to a smaller radius position, leaving the tone-arm setter in whatever position it then occupied.

To enable the tone-arm setter to perform its necessary swings, taking account of the fact that said tone-arm setter is pivoted at a point behind the axis of the tone-arm proper, said tone-arm setter is formed with the curved form as shown in Figures 8, 26 and 27, so that necessary movements may occur without improper interferences.

I shall presently describe the means which I have provided for determining the inward limit of movement of the tone-arm setter, to thereby determine the setting of the tone-arm into either the large or the small diameter record position.

I shall now describe the means which I have provided to effect lateral shift of the lowermost record which may be sustained on the shoulder 56 of the center post and on the stand 58 which occupies the rear left-hand corner of the structure:

This stand 58 is in the form of a hollow post 138. A vertically extending rock arm 139 is placed in this post, said rock arm being pivoted to rock on the cross pin 140. The lower portion of this rock arm reaches down through a suitable slot in the table to a position beneath the table; and this lower portion of said rock arm is provided with the two notches 141 and 142, as well shown in several of the figures. The extreme lower end of this rock arm is provided with a spring engaging finger 143 to which is connected one end of a spring which serves normally to rock the arm at the proper time for a record feed, but which spring may extend in case the rock arm should be blocked against such swing, as will presently appear.

The upper end portion of this rock arm reaches up and out of the upper portion of the stand 138 to a position where the record may be properly engaged and acted upon. Such engagement between the rock arm and the edge portion of the record may be by either a direct engagement or through the intermediary of another element, as will soon appear. The stand 138 is provided with the two ears 144 and 145 which lie at opposite sides of the rock arm; and a tongue carrying plate 146 is pivoted to these ears so that said plate may be set into either of two positions, according to whether the device is to function on small or large records. Such pivotal connection of the plate to the ears is effected in any convenient manner, as by means of the ears 147 and 148 which are struck up from the plate and lie against the inside faces of the ears 144 and 145 already referred to.

When this tongue carrying plate 146 lies in its small record position (as shown in Figures 15 and 16) the body portion of said plate lies against the top of the stand 138; but the projecting portion of said tongue carrying plate 146 is preferably formed at an angle of about ten degrees from the rest of said plate so that at such time said portion 149 of said plate lies or extends slightly upwardly as well shown in Figure 16, for example. This angle of rise will thus bring this portion of the plate into substantial parallelism with a record which lies just above the plate in its outer peripheral portion, and has its center supported by the shoulder 56 of the center post. When a small sized record is to be accommodated the plate 146 is set into the position shown in Figure 16, for example, whereupon the edge portion 150 of such small sized record rests on the upwardly slanting portion 149 of the plate 146; whereas when a large sized record is to be accommodated the plate 146 is swung over into the position of Figure 18, for example, and out of the way of such record; and then such large sized record's edge portion 151 will rest directly on the upper portion of the stand 138. The parts are so proportioned that the foregoing accommodations of the two sizes of records are provided for.

Now the plate 146 carries the reciprocable tongue element 152 which may be shifted back and forth with respect to said plate through a sufficient extent to ensure proper record feed for the small sized records. This tongue element is in the form of a small bar provided with a slot 153 which receives a threaded stud 154, said stud threading into the plate 146 (or portion 149 thereof), and a lock nut 155 is placed on the end of this stud to lock the same when it has been adjusted to a position such as to retain the tongue properly in place but without binding said tongue against the face of the plate 146. This tongue bar is straight, whereas the plate 146 is bent, as already explained; so I have provided the slot 156 in the plate 146 and in which slot said tongue may work, thus allowing the outer end portion of the tongue to be continued a considerable distance beyond the bend of the plate 146. It is here noted that this tongue works against the upturned portion of the plate 146 so that such a scheme is necessary in order to maintain the desired relationship between the several parts.

Normally this tongue stands at the position shown in Figure 16 such that the outer end of the tongue lies to the left of the right hand edge of the plate portion 149, the slot 153 of the tongue permitting such movement to occur. This provides for support of the edge portion 150 of the small sized record directly by the plate portion 149, but a slight shift of the tongue towards the right in Figure 16 will cause the record to be shifted sufficiently to disengage the record from support by the plate portion 149, so that the record will be released and permitted to descend. At the same time the central portion of such record will have been disengaged from support by the shoulder 56 of the center post. It is noted that the thickness of the tongue plate 152 is not greater than (preferably slightly less than) the thickness of a record, so that only the bottom record of a series of records sustained by the post 138 will thus be released at each operation. The construction of the center post 55 and shoulder portion 56 thereof are such that only a single record is permitted to shift laterally at each feeding operation. The details of this construction are well known in the present art.

The tongue 152 is to be shifted back and forth according to the rocking movements of the rock arm 139 when the small sized record is being handled. For this purpose, when said plate 146 is set into the position shown in Figure 16 the upper end portion of the rock arm 139 directly engages said tongue plate; and the said tongue plate is provided with a slot in its rear or outer portion 157 through which the upper portion of the rock arm reaches when the tongue plate stands in the small record position. This slot is so proportioned that as the rock arm is rocked forwardly for a record feed the inner or right hand end of said slot 157 is directly engaged, to thereby shift the tongue to the right for a record feed. This left hand or outer end portion of the tongue, being the portion having the slot 157, is also provided with upturned end portions as shown at 158, which lie to both sides of the rock arm; and the rock arm is provided with the short cross pin 159 which will engage these upturned end portions 158 to restore the tongue towards the left when the rock arm is again rocked backwardly or towards the left, being its normal or un-operated position. Thus the complete back and forth movements of the tongue necessary to feed a record, and then to restore the tongue to its normal position, and permit the next record to descend into place against the plate portion 149, are effected by the rocking of the rock arm 139, when said tongue is set into the small record position as shown in Figure 16.

In Figures 17 and 18 I have shown the foregoing parts in the positions which they occupy when the tongue carrying plate 146 has been turned over for feeding large sized records. In this case said plate 146 lies completely to the rear of the rock arm 139, the tongue bar 152 being above the plate 146 by which it is carried. Due to the presence of the slots 153 and 157 in the tongue, said tongue can be thus overturned and disengaged from the rock arm which rock arm will thereafter rock free of the tongue. When the parts are thus overturned the upper end of the stand 138 will be unobstructed in advance of the rock arm, so that the larger sized record 151 may then set down directly onto the top of the stand 138, being edge supported thereby as well shown in Figure 18. Then when the rock arm is rocked for a record shifting operation, said rock arm will directly engage the edge of such larger record, shifting it laterally for disengagement of its edge from the stand and permitting said edge to descend. At the same time the central portion of such larger record will also be disengaged from the shoulder 56 in a manner similar to that already explained.

Manifestly such change-over from small to large records, or vice versa, should be accompanied by suitable control of the stoppage of the tone-arm setter so that the tone arm will always be set at the proper position for engagement of the stylus with the beginning convolution of the sound track on the record which is in place. I shall now show how such inter-connection between the parts is effected.

I have made provision such that the act of setting the plate 146 in either the large or the small sized record position will of itself effect suitable adjustment of the stoppage of the tone arm setter. For this purpose I have provided the shiftable bar 160 carried by the table. This bar is provided with the end slots 161 and 162 which receive the stationary stud 163 and the pin 164, respectively. The pin 164 is carried by the rock arm 165, pivoted to the table at the point 166. A spring 167 connects the bar 160 to this rock arm 165 in such manner that the bar 160 always tends to move backwardly or away from the observer in Figures 8, 26 and 27 as far as may be limited by engagement of the slot 161 with the pin or stud 163, unless some other element interferes with such movement temporarily. This bar 160 has the finger 168 struck downwardly therefrom far enough to lie in the path of lateral movement of the tone-arm setter or a portion connected to such setter. This is the lug projection 169 extending to the left of the body of said tone arm setter. This lug will come against the lug 168 of the bar 160 when said bar is in the lowered position shown in Figure 26, thus limiting the inward or left hand movement of the tone-arm setter, such limitation occurring at the exact position of the setter corresponding to placement of the tone-arm down onto the face of the record at the beginning of a large sized record sound track. In other words, this is the position for large sized records. On the other hand, if the bar 160 is in the position shown in Figures 8 and 27 when the tone-arm is permitted to shift inward, together with the tone-arm setter, said setter will proceed further inward, carrying the tone-arm to a position correspondingly further inward, until finally the body portion of the setter proper will come into engagement with the lug 168, as shown in Figure 27. This is the position which the setter should reach to carry the tone-arm to its position for placement at the beginning of the sound track of a smaller sized record. Consequently, therefore, means which will control the positioning of the bar 160 at either of the foregoing positions will serve to control proper placement of the tone-arm for either size of records. It is noted that the lengths of the slots 161 and 162 are such as to permit of the foregoing results being secured.

The rock arm 165 previously referred to has its left-hand end carried to a position beneath the stand 138, and a spring 170 is connected to said rock arm and to another part and tends at all times to rock the arm 165 in direction to shift the stop bar 160 into the position shown in Figure 26, being the large record position. Pressure against the left-hand end of the rock arm 165 will serve to shift the parts into the position of Figure 27, and release of such pressure will permit said parts to again resume the position shown in Figure 26. Examination of Figures 19, 20, 21 and 22 shows the presence of a vertically placed rock arm 171 extending through the stand 138. This rock arm is pivoted to the inside of the stand for rock on the pivot 172, such rocking being effected in a vertical plane which lies at substantially 45 degrees to the plane of rock of the rock arm 139 which feeds the records. It is noted that the stand is carried by the table in one corner of said table, so that the rocking of the arm 139 for record feed should occur in a plane extending towards the center post, and therefore in a plane lying at substantially 45 degrees to the front edge of the table. On the other hand, the rocking of the arm 171 should be within a plane extending directly from front to back of the table, being at 45 degrees to the plane of rock of the arm 139, and such diversity of rock planes is secured by the placement of the pivot 172 as already explained. This rock arm 171 has a bur or stud 173 facing upwardly at one side of the pivot point; and a pin 174 is slidingly set into a socket in the upper portion of the stand 138, so that said pin directly engages the stud 173. Preferably said pin has the enlargement 175 at its lower end so that proper engagement of the pin with the stud 173 will occur throughout the range of swing of the arm 171. The plate 146 is provided with the backwardly extending finger or projection 176, the edge portion thereof being curved as shown in Figures 16, 18, 20 and 22, so that as the plate 146 is turned over into the small record position said projection will slide over and press down against the pin 174, thus forcing the arm 171 to rock into the position of Figure 20, where said arm will press the arm 165 over into the position of Figures 8 and 27, being the small record position. Such condition will then continue until the plate 146 may be overturned to the position of Figures 18 and 22, being the large record position, in which position the arm 171 is permitted to swing backwardly to the position of Figures 18 and 22, the arm 165 being at the same time allowed to swing under the impulse of the spring 170 into the position of Figure 26, being the large record position. It is thus evident that I have provided an interconnection between the plate 146, which is set for either large or small record operation, and the stop bar 160 for the tone-arm setter, so that these parts always function in proper harmony.

It is here noted that the projection 169 of the tone-arm setter is provided with the two side or lateral teeth 177 and 178, providing between them an edge surface which will engage the lug 168 of the stop bar 160 for the large record position. In order to prevent any shifting of the stop bar 160 until the tone-arm setter has been swung outwardly into a position corresponding to outward setting of the tone-arm proper to a position where it will clear the records, these teeth will engage with the lug 168 and prevent any shifting of the stop bar 160 while the tone-arm setter is in its inwardly moved position, such as shown in Figure 26. The length of the slot 162 is such that if the rock arm 165 should be rocked from its position of Figure 26 to its position of Figure 27, while the stop bar is thus locked by the teeth 177 and 178, the spring 167 will be expanded, without shift of the stop bar; and then, when the tone-arm setter is afterwards moved outwardly far enough to release the teeth 177 and 178 from the lug 168, the stop bar will move under the force of the spring 167 to the position of Figure 27, being the small record position, and as determined by the previous setting of the rock arm 165 under control of the plate 146 and finger 176 of the stand. In other words, it is possible to anticipate the final shifting of the tone-arm setter, and is not necessary for the operator to await final outward movement of the tone-arm before he may re-set the plate 146 for records of the smaller size.

Likewise it is to be noted that when the stop bar 160 is in the position of Figure 27, being the small record position, the lug 168 lies above the lug 169 of the tone-arm setter, so that under these conditions it is not possible for the stop-bar to be moved downwardly or towards the observer in Figure 27. If under these conditions the plate 146 should be re-set to the position of Figure 22 (being for large sized records), from the position of Figure 20 where it previously stood, the pressure exerted by the rock-arm 171 on the arm 165 woul be relieved. This would permit the spring 170 to rock the arm 165 into the position of Figure 26, but since the lugs 168 and 169 were still interengaged the stop-bar 160 would be retained in its previous position (that of Figure 27 for small records), until the tone-arm setter had been moved outwardly far enough to discontinue such inter-engagemnt of said lugs. The movement of the arm 165 without corresponding movement of the stop-bar is permitted by reason of the slot 162. As soon as the tone-arm setter had thereafter moved outwardly far enough to disengage the lug 169 from the lug 168 the stop-bar 160 would shift upwardly or towards the rear under impulse of the spring 167, carrying said stop-bar to its twelve inch position, for which the plate 146 had previously been set. Thus it is also possible to anticipate the movements of the stop-bar and the tone-arm setter in a re-setting of the plate 146 either from the ten inch to the twelve inch position, or vice versa, from the twelve inch to the ten inch position. Evidently, in any case when the plate 146 is reversed to accommodate records of the other size, if the tone-arm setter has previously moved outwardly far enough to prevent interlock, no interlock will occur, but the stop-bar will follow the movements of the plate 146 immediately to the new position as determined.

Means are provided for stopping the cam drive under various conditions, which means and conditions I shall now disclose:

It is desired to discontinue the cam drive normally at completion of a single complete rotation of the cam element 107, but in this connection it is also required that drive of this cam element shall be commenced and carried through to such completion, the commencement being effected when the tone-arm reaches its normal limit of inward movement. I have shown how discontinuance of this cam drive may occur when the stop cam 113 comes around far enough to cause the shoulder 114 to draw the pin 117 over and thus to rock the bell crank 96, carrying the wheel 103 away from its driving engagement with the wheel 93. To again drive the cam element through its cycle it becomes necessary to disengage the pin 117 from said shoulder 114. In normal automatic operation this is effected in the following manner: I provide a lever element 179 pivoted to the table at the point 180. This lever has the arm 181 lying in a plane such that upon rocking the lever in counterclockwsie direction this arm 181 will act against the pin 117, moving said pin down far enough to disengage it from the shoulder 114, and thus releasing the bell crank and instituting a new cycle of one cam rotation. This lever 179 also has another arm 182 lying in a plane such that a pin 183 carried by the tone-arm lever 118 will strike against said arm 182 at the position where the tone-arm has reached the inner limit of its movement in playing direction, namely towards the turntable axis. By the foregoing means the one-cycle rotation of the cam element is instituted automatically at completion of the playing of the record. Thereafter said cam will go through its complete cycle of rotation, causing other elements to perform their functions in proper timing.

An additional means of starting the one-cycle operation is by manual means. Such manual commencement of the one-cycle movement may be desirable, for example, when it is desired to "reject" a record already in place for playing. I have provided a manually operated lever element 184 pivoted to the table at the point 185. This lever lies beneath the table, but a manual control button 66 is provided therefor. This button 66 is carried by the short shaft 67 passing down through the table; and a short crank arm 68 is connected to the lower end of said shaft. This crank arm 68 carries the pin 186 which engages a slot 187 in the lever element 184, so that rock of the button 66 serves to correspondingly rock the lever element 184 beneath the table. This rocking of the lever element 184 is according to the designations shown at the position of the button on the top of the table.

The lever element 184 has the several notches 188 which may be selectively engaged by the roller 189 carried by the arm 190 pivoted at the point 191 to the table; and a leaf spring 192, which is passed between two studs 193 and 194 secured to the table, has its end portion pressing against a lug 195 struck down from the arm 190. By this means the roller is strongly pressed against the selected notch of the lever arm 184. These notches are properly spaced in comparison to the markings on the top face of the table adjacent to the button 66, so that the lever position will correctly lock for each of the indicated and selected button positions.

The lever element 184 carries the arm 196 which reaches to a position close to the lever element 179. Said lever element in turn has a third arm 197 on which there is formed the lug 198 extending into the path of movement of the arm 196 when the lever element 184 is rocked to the position designated as "reject" on the face of the table. Such rocking of the lever element 184 by turning the button 66 to the "reject" position thus acts to rock the lever 179 and disengage the pin 117 from the shoulder 114 of the stop cam. Thus the one-cycle cam will be engaged for drive through a cycle of movements, resulting in a "rejecting" operation; that is, the tone-arm will be raised from the record, then rocked outwardly to its position free of the record, then a fresh record will be released into playing position, the tone-arm will be moved inwardly to correct position above the record according to the diameter of such fresh record, and finally the tone-arm will be lowered into playing engagement with the record. It is noted that such "rejecting" operation is an abnormal operation, so I have not provided a notch in the lever 184 corresponding to this position.

It may be here noted that the institution of the one-cycle operation at completion of playing as previously described, wherein the pin 183 of the tone-arm lever 118 engages the lever arm 182, is performed by the carrying of the tone-arm inwardly to an extreme extent of movement. Such operation may be effected, for example, by that type of record which is provided with a spiral terminal portion of the sound track, the spiral reaching rapidly inwards to the position necessary to trip the lever 179. In order to ensure definite tripping of the pin 117 from the shoulder 114 to institute the one-cycle operation in the case of records which are provided with an eccentric circular terminal sound track portion, I have provided the tone-arm lever 118 with the cross-wise extending portion 199 having the rather fine teeth 200 on its arcuate edge; and the trigger element 114a is provided with the dog 201 pivoted in position to be engaged by these teeth as the tone-arm lever 118 is rocked back and forth by the eccentric circular terminal of such type of record. This operation will result, after one or more rocking movements of the tone-arm lever by such eccentric terminal, in shifting the trigger 114 sufficiently to disengage the pin 117 from the shoulder 114, with consequent institutions of a one-cycle movement.

The lever element 105 is provided with a curved shoulder 201a facing away from the pivotal point of the lever element 184. The lever element 184, being the manual control element which is set by the button 66, is provided with a pin 202 which may move over the path of movement of the shouldered portion 201a so as to interfere with rocking of the lever element 105 at such times. The parts are so proportioned that such interference will occur when the button 66 stands at either the "off" position or the "manual" position, the "off" position being that shown in Figure 8. When said button is moved over to the "automatic" position, or is held temporarily at the "reject" position, the pin 202 has moved over far enough to clear said shoulder 201, so that interference does not then occur between these parts. Such interference, when it occurs, prevents the bell crank 105 from rocking to position where the wheel 103 would engage the wheel 93, so that during such condition no drive of the one-cycle cam can occur; whereas when the pin 202 stands at a position free of such interference the proper functioning can occur for one-cycle cam drive.

The manual control lever element 184 also has the finger 203 which may engage with and rock the arm 204, pivoted to the table at the point 205. These parts are so proportioned that such engagement between these parts will occur only when the manual control lever 184 has been moved over to the "off" position, as shown in Figure 8. The pin 94 which reaches down from the triangular plate 89 carrying the idler wheel 93 will be engaged by said arm 204 to shift the triangular plate over to the right only at the "off" position of the manual control lever 184, so that for such position of the manual control lever the frictional engagement for turntable drive, as well as for one-cycle cam drive, is discontinued. As soon as the manual control lever 184 has been set over to the "manual" position, or to any further position away from the "stop" position, the wheel 93 will be drawn over to the left by the spring 92, thereby re-engaging said wheel with both the motor pinion 86 and the turntable flange.

There is a motor switch 206 carried by a plate 207, which plate is in turn set onto the two studs 193 and 194 already referred to. Said switch has the bifurcated trigger control finger 208 by which the switch contacts are functioned; and movement of this finger 208 to the right into the position of Figure 8 results in cutting off the current from the drive motor 83; whereas movement of said finger to the left of the position shown in Figure 8 will result in the closing of the switch contacts and supply of current to the motor. The manual control lever element 184 is provided with the finger 209 which engages between the bifurcations of the finger 208 when a movement of the control lever towards the right (in Figure 8), towards the position shown in that figure, brings the finger 209 between the bifurcations of the finger 208. Final movement of the control lever into the position shown in Figure 8 results in the opening of the switch, and any movement of the control lever towards the left from the position of Figure 8 will result in closing of the switch, which switch will then remain closed until the position of Figure 8 is again closely approached by lever movement back to the position of that figure.

It thus appears that when the manual control button 66 is moved to the "stop" position, not only will the idler wheel 93 be shifted away from engagement with both the motor pinion and the turntable flange, but such positioning of the button 66 will also result in opening the motor circuit and stoppage of the motor itself. Movements of the button 66 to other positions than the "stop" position will also result in re-supply of current to the motor and re-engagement of the wheel 93 with both the motor pinion and the turntable flange.

It has previously been stated that the vertical rock-arm 139 within the stand 138 is rocked to effect feed of the new record into position for playing, and the various functions connected with such rocking have been described. I shall now show how the rocking of the arm 139 is effected in proper timing with the one-cycle cam movements, etc.

There is a plate 210 of generally triangular form pivoted to the table, such pivoting being conveniently effected on the same stud 166 whereon the arm 165 is pivoted. This plate 210 has the flange 211 extending downwardly towards the one-cycle cam in position to be engaged by and forced towards the left by a stud 212 carried by the one-cycle cam when said cam reaches a position in its rotation substantially one-half rotation from the position as shown in Figures 8, 30 and 33. When not engaged by said stud 212 the plate 210 is drawn over to the position shown in Figure 8, 30 and 33 by spring means; and conveniently the same spring 170 may serve this purpose, one end of said spring being connected to the plate 210 and the other being connected to the arm 165. A stud 213 carried by the table reaches through a slot 214 of the plate 210 to limit rocking movements of said plate but without interfering with the extent of movements required for normal functioning of the plate 210.

There is a slide bar 215 slidably mounted on the bottom of the table for reciprocation along a line which is generally radial of the turntable. The inner end of this slide bar is pivotally connected to the plate 210 by the pin 216 as shown in Figures 8, 30 and 33, so that rocking movements of the plate are converted into reciprocations of the slide bar and under control of the plate. If desired a spring 217 may be connected between this slide bar and a stationary stud 218 (preferably the same stud to which the spring 104 is connected), said stud being carried by the table. This spring 217, when provided, will supplement the action of the spring 170 insofar as concerns restoration of the plate 210 and the slide bar to the positions shown in Figures 8, 30 and 33.

The slide bar 215 is provided with a slot 219 through which the lower end portion of the rock arm 139 passes, so that proper engagements between the slide and the rock arm are produced. This inter-engagement preferably includes the notch 142 with which the slide will engage, thereby ensuring that the slide shall not slip either up or down along the rock arm due to transmission of forces between these parts. Furthermore, this slot 219 is of sufficient length to permit of lost motion occurring between the slide and the rock arm under certain conditions. A spring 221 connects the end of the slide with the lower end of the rock arm, as shown in Figures 31, 32, 34 and 35, said spring tending at all times to draw the rock arm towards the left hand or outer end of the slide and into the position of Figures 31, 32 and 34, but in case the rocking movement of the rock arm should be blocked when the slide is shifted, said spring may yield, permitting movement of the slide without movement of the rock arm, and resulting in extension of the spring, into the condition shown in Figure 35. Normally the force of the spring is sufficient to ensure proper rock arm rocking by transmission of force from the slide through said spring, so as to thereby ensure proper record releasing action, etc.

With the foregoing scheme it is evident that each time the one-cycle cam comes around to position where the stud 212 will press against the flange 211 of the plate 210, said plate will be rocked to the left in Figures 8, 30 and 33, resulting in movement of the slide also to the left (at an angle of forty-five degrees, and along the radial line), thus also permitting the spring 221 to carry the rock arm with the slide during such slide movement, and feeding a record; but it is also evident that in case the movement of the arm should be blocked by some means, the slide could nevertheless move to the left, leaving the rock arm unmoved, the spring 221 yielding during such operation. It is, of course, understood that normally the spring 221 retains the rock arm against the left hand or outer end of the slot, and also that the length of the slot is sufficient to permit full slide movement without simultaneous rock arm movement.

In order to effect a "repeat" operation the following devices have been provided:

The blocking of the rock arm 139 so that it cannot follow the movements of the slide will prevent release of a new record, and will therefore result in a re-playing of the record already in place, when the one-cycle cam has completed its cycle of movements. Arrangements for blocking the rock arm 139 are disclosed and claimed in my copending applications, Serial Nos. 576,202 and 589,756, now Patents Nos. 2,517,050 and 2,473,829, respectively. In the present invention I have provided the button 71 on the table, which button is carried by the short shaft 72 having the crank arm 73, as already explained. A repeat slide 222 is slidably mounted beneath the table just above the slide 215. This repeat slide 222 has the slot 223 receiving the rock arm 139, and the rock arm is preferably notched as shown at 141 at the position of the repeat slide so as to ensure correct engagement between these parts when in operation. The end of the repeat slide away from the rock arm is connected by the pivotal connection 225 to the lever arm 226, which lever arm is pivoted to the table at the point 227. A link 228 connects the other end of the lever arm to the crank 73, by the pivotal connections 229 and 230, respectively. Thus, by rocking the button 71 between its two positions the slide bar 222 for repeat is moved from one position to the other. When said button stands in the normal position the repeat slide bar is in the positions of Figures 31 and 32, permitting the rock arm 139 to function normally for a record feed; whereas when the repeat slide bar is shifted to the position of Figures 34 and 35, by turning the button 71, said repeat slide bar will have its slot 223 drawn back so as to directly engage the edge of the rock arm 139 even when said rock arm is in its normal or unlocked position, and no rocking movement of said rock arm may then occur. Then, when the slide 215 is shifted out for an operation, under influence of the one-cycle cam, the spring 221 will extend but no record feed will occur.

This "repeat" device is herein shown in full detail, so as to show its relation to other parts of the entire mechanism, but I do not claim the same herein, as same constitutes the subject-matter of my application for Letters Patent of the United States, Serial No. 609,101, now Patent No. 2,511,604.

When the last record of a series carried by the stand 138 and by the shoulder 56 of the center post has been released and permitted to descend to playing position, and when that record has been played, means should be provided to bring the operation of the machine to a stop automatically. Such means I have provided herein, and I° shall now describe the same in detail:

I have provided a lever arm 231 beneath the table and pivotally mounted thereon, preferably on the same stud 166 which carries the arm 165 and the plate 210. This arm 231 has its inner end pivotally connected to a slide bar 232 or link, by the pin 233, and the other end of said link connects by the pin 234 to a slide bar 235. This slide bar 235 lies close to the stop cam element 113, and carries a pin 236 which projects into the plane of said stop cam element so that upon occasion interference may be produced between these parts, that is, between the shoulder 114 of the stop cam and said pin 236. The slide bar 235 is provided with the slot 237 through which passes the pin 238 carried by the table, so that a proper amount of sliding movement is possible between the slide bar and the table, and the movement of the slide towards the right in Figures 8, 28 and 29 is limited thereby.

Now the slide and its pin 236 are so located that in case the arm 231 is tilted into the position of Figures 8 and 28 prior to commencement of a rotation of the one-cycle cam, when the shoulder 114 of the stop cam comes around to the position of the pin 236, said pin will be engaged by said shoulder and the slide bar 235 will be shifted over towards the left in Figures 8 and 28, the pin and slot connection 237—238 permitting such shift to occur.

There is a lever arm 239 pivoted to the bottom of the table on the pivotal point 240; and one end of this lever arm is so located that it will be engaged by the slide bar 235 as said slide is projected towards the left, as just previously described, thus rocking said lever arm 239 from the position of Figure 28 to the position of Figure 29. The other end of this lever arm is so related to the arm 105 of the bell crank carrying the idler wheel 103 that rock of the arm 239 serves to also rock said bell crank and thus to carry the idler wheel 103 away from the wheel 93, and thus to discontinue drive of the one-cycle cam, which cam will then at once come to rest at that position where it stood at the time. The parts are so proportioned that such arresting of drive of the one-cycle cam will occur at about the mid-position of rotation of said cam, and in any case should occur prior to engagement of the stud 212 carried by said cam, with the flange 211 of the plate 210. Under these conditions the one-cycle cam will come to rest prior to actuation of the rock arm 139 of the stand 138, so that a feeding operation will not occur.

When such stoppage of the drive to the one-cycle cam has been produced it is seen that said cam will not again be driven until by some means the lever arm 239 and slide bar 235 be permitted to restore to the position of Figures 8 and 29 under the force of the spring 104a. Such release may be effected by permitting the arm 231 to rock back to its position of Figure 28, carrying with it the link 232 and rocking the slide bar 235 upwards so as to carry the pin 236 away from the shoulder 114 of the stop cam 113. When this occurs the spring 104 will again rock the bell crank 105 over to carry the wheel 103 into engagement with the wheel 93, to continue the drive of the one-cycle cam for completion of its cycle, and at completion of said cycle said one-cycle cam will again come to rest in the normal manner as already explained.

The restoration of the parts just above explained will also be accompanied by swing of the arm 239 from the position of Figure 28 back to the position of Figure 29, the pin 236 moving towards the right past the position of the shoulder 114 of the stop cam 113. Such movement is permitted by the pin and slot connection 237—238.

Now I have provided means to effect control of the positioning of the rock arm 231, since it is evident that such positioning is necessary to secure correct functioning of the parts already explained. Such positioning might be effected manually, but in the present case I have shown automatic means therefor. The stand 138 which supports the edge portions of the unplayed records, either directly or indirectly, is provided with a head element 241. This head element is carried by the cross shaft 242 which is secured to the head element and rocks therewith as the head element may be raised and overturned or restored to its normal position, or be permitted to lower to an abnormal or stopping position. This head element is also provided with the pads 243 and 244 which face downwardly and contact the face of the topmost record which may at the time be sustained by the stand. These pads are preferably made of rubber or other yieldable material of softness and texture which is not injurious to the record faces. The shaft 242 is provided with the crank or offset portion 245 to which is connected one end of a spring 246, the lower end of said spring being connected to a cross bar 247 located in the lower portion of the stand. The crank is so formed that when the head stands in its normal or substantially horizontal position the spring exerts a substantial downward pressure of the pads on the topmost record, and said crank is also so positioned that when the head is over-turned to the position of Figure 18 the spring goes over dead center, so that the spring then tends to hold the head in such overturned position.

It is here noted that by overturning the head from the position of Figure 16 to that of Figure 18 the space above the stand is cleared so that new records may be set into place; and also, when the head is so overturned the plate 146 may be overturned from the ten inch to the twelve inch position, or vice versa, the clearances between the parts being made such as to permit of this operation being performed.

Now the shaft 242 carries, in addition to the crank 245, the forwardly reaching arm 248 whose free end portion 249 is downturned as well shown in Figures 23 and 24. There is a rock arm 250 pivoted to the inside of the stand 138 at the point 251; and the plane in which this rock arm swings lies at 45 degrees to the plane in which the rock arm 139 swings. In other words, the planes in which the rock arms 171 and 250 swing lie parallel to each other and at 45 degrees to the plane in which the rock arm 139 swings. The rock arm 250 has the nub or stud 252 facing upwards and offset from the pivotal point 251, and this nub or stud 252 lies in position to be engaged by the downwardly reaching portion 249 of the arm 248 when the head 241 and shaft 242 are rocked far enough by downward movement of the head. At other times the lower end of the crank arm 249 does not engage the nub or stud 252 but allows the rock arm 250 to remain in its normal or un-actuated position. The parts are so proportioned that as long as there is at least one record in place on the stand, with the pads 243 and 244 resting thereon, the head is sustained at such an elevation that the end 249 of the arm 248 permits the rock arm 250 to remain in the position shown in Figure 23, whereas when the last record has been released and has descended from its support on the stand the head will rock down to the position of Figures 24 and 25, thereby causing the end 249 of the crank 248 to press against the nub or stud 252 and thus to rock the arm 250 over from the position of Figure 23 to that of Figure 24.

There is a spring 253 connected to the lower end of the rock arm 250 and to the stud 254 carried by the table, said spring tending to draw the rock arm at all times into engagement with the end portion of the rock arm 231. There is also a spring 255 connected to the rock arm 231 and to the stud 256 carried by the table, which spring 255 tends to draw the rock arm 231 from the position of Figure 29 to the position of Figure 28. Such movement also tends to swing the rock arm 250 from the position of Figure 23 to the position of Figure 24, that is, where the nub or stud 252 finds its lowermost position. This also corresponds to the position in which the head 241 is fully lowered. It is here noted, however, that the spring 253 is made stronger in its effect than the spring 255, so that normally the parts are retained in the position shown in Figure 23, with the rock arm 250 swung over and the head in its raised position; and then when the last record has been released the head is permitted to fall under impulse of its spring 246, and the parts are forced by the spring 246 acting through the shaft 242 and arms 248 and 250, from the position of Figures 23 and 29 to the position of Figures 24, 25 and 28, thus placing the pin 236 in position where it will interfere with the functioning of the one-cycle cam at the proper time, and bring the parts to rest, as has already been explained.

It is here noted that when the mechanisms are thus automatically stopped due to absence of a record in place on the stand, the tone-arm has been carried out clear of the turntable and any records carried thereon, but prior to actuation of the feeding rock arm 139. This condition said parts will retain until the head is again raised by the operator, and with release of the rock arm 250 from its position of Figure 24 back to its position of Figure 23. In this connection it is noted that during this operation, if the arm 231 should not be able to move correspondingly, due to engagement of the pin 236 with the edge of the stop cam 113 (assuming that the one-cycle cam had not had time to turn far enough to bring its shoulder 114 past the position of the pin 236), the rock arm 250 and arm 231 will merely remain in the position of Figure 29, the arm 248 moving up and away from the nub or stud 252 as the head is raised. Then, afterwards when the stop cam 113 has moved far enough to carry its shoulder 114 past the position of the pin 236, said pin may fall against the edge of the stop cam, and the other parts will come to corresponding positions.

Provision has been made for locking the tone-arm setter in its outermost position under certain conditions, and for releasing said setter for its normal operation under other conditions. In this connection it is noted that this tone-arm setter serves to provide a spring force which, when permitted to function normally, serves to move the tone-arm proper inwardly to the proper position for lowering to bring the stylus into contact with the record then in place for playing. Nevertheless it is also noted that the tone-arm proper may be rocked inwardly independently of the tone-arm setter so that said tone-arm proper may thus be manually set without having to move the setter correspondingly.

It is also noted that the spring which operates on the tone-arm setter (spring 136 of Figures 8, 26 and 27) tends at all times to shift the setter inwardly unless and until such shift is restrained or prevented. When the one-cycle cam is rotating and the cam follower pin 119 is engaged by the cam track 120 there is produced a restraining and controlling force to offset and overcome the action of the setter spring 136; and also when the lug 169 of the setter arm is in engagement with either the lug 168 of the slide bar 160, or the setter arm proper is in engagement with said lug, there is provided a limiting restraint which will prevent the setter from moving inward farther than permitted by such restraint. However, when the one-cycle cam is in its initial or non-rotated position it does not act on the cam follower pin 119 and thus there is no prevention at such time acting to restrain the setter from holding the tone-arm at either the ten inch or the twelve inch position, except for the means which I shall presently disclose.

It is, however, desirable that when the record-changer is idle, and not being used, some means be provided for locking the tone-arm setter in its outermost position, so that at such times the tone-arm proper may also stand in its outermost position, and where it is clear of the records and other parts. Nevertheless, even at such times the tone-arm may be manually moved inwardly, if desired, leaving the setter in its outwardly locked position. These means I shall now describe:

I have provided a hook shaped lever 257 (see Figures 8, 26 and 27) pivoted to the under face of the table at the point 258. This hook shaped lever reaches down or forwardly far enough to clear the stud 137 already referred to, except that said stud may serve to limit the swinging movement of this hook shaped lever in its rocking in a clockwise direction. This hook shaped lever has the finger 259 which terminates in the downwardly struck lug 260, said lug being so formed that when the hook shaped lever is rocked to the position of Figure 8, being its fully rocked position as determined by the stud 137, said lug 260 will stand in position to interfere with inward movement of the lug 169 of the setter, so that under these conditions the setter cannot move or rock inwardly, under the force of its spring 136, even when otherwise allowed to do so. This position of the setter is far enough outwardly to not act on the tone-arm proper even when said tone-arm proper stands in its extreme outward position where it is clear of the records. Under these conditions, therefore, the tone-arm may remain in its extreme outwardly moved position without other locking provision therefor. However, by afterwards swinging the hook shaped lever down far enough to bring its lug 260 to a position where said lug will not interfere with the inward movements of the lug 169 of the setter it is evident that the setter may then function normally and serve its purpose of setting the tone-arm to either the ten or the twelve inch position as determined by other devices already described. It is also desirable to interlock this hook shaped lever and its movements and positions with the manual control lever 184 to ensure correct functioning under all conditions.

I have provided a link 261 extending between the manual control lever 184 and the hook shaped lever 257. This link is then interconnected with both said parts by pin and slot connections as follows: Between the link and the manual control lever 184, by the slot 262 in the link and the pin 263 carried by the lever; and between the link and the hook shaped lever, by the slot 264 in the link and the pin 265 carried by the lever. A spring 266 connects the link to the stud 258 whereon the hook shaped lever is pivoted, said spring serving to draw the link upwardly or towards the rear of the table. It is also here noted that under certain conditions this spring will produce a lateral component of force at the position of the pin and slot connection 264—265 which force will so act as to tend to rock the hook shaped lever clockwise, that is, towards the locking position of the hook shaped lever shown in Figure 8; whereas at other times this spring tends to rock the hook shaped lever in the contrary direction. Thus, when the parts have been so positioned as shown in Figures 26 and 27 that the link 261 has moved upwardly to carry its lower slot end 262 against the pin 263, with the pin 265 below the upper end of the upper slot 264, the tendency of the spring is to rock the link towards the right, or clockwise, carrying the hook lever to the right also, or in counterclockwise direction. On the contrary, when the parts are in the relative positions shown in Figure 8, with the pin 263 above the lower end of the slot 262, so that the link is free to move upwardly under the force of the spring, it is evident that such spring force, moving the link upwardly, with the pin 265 against the lower end of the slot 264, will tend to rock the link towards the left, or counterclockwise, carrying the hook lever also to the left, or clockwise.

It is here noted that when the down struck lug 260 of the hook lever lies against the lug 169 of the tone-arm setter, the two teeth 177 and 178 of the lug 169 lie at the two sides of the lug 260 of the hook lever, so that once the hook lever has engaged with the lug 169 of the tone-arm setter such engagement cannot be discontinued merely by rocking the hook lever downwardly, or counterclockwise, but must be preceded by a slight rock of the tone-arm setter towards the right, against the force of the spring 136. Thereafter the hook lever may, upon proper placement of the other parts, be moved downwardly or counterclockwise to a position where it will not interfere with the inward movements of the tone-arm setter according to normal functioning.

Likewise, when the tone-arm setter stands in a position such as that of Figures 26 and 27, where the lug 169 lies across the path of up-swing of the lug 260 of the hook lever, said hook lever cannot be rocked clockwise sufficiently far to reach its interlocking position until the tone-arm setter has been first moved towards the right far enough to provide clearance between these parts. However, if the link 261 should be raised or permitted to rise far enough to itself allow the hook lever to rock over to the locking position of said hook lever, the tone-arm setter, however being in position where it will prevent the hook lever from reaching its interlocking position, in such case the lug 260 of the hook lever will rest against the edge of the lug 169 of the tone-arm setter, and as soon as the tone-arm setter has thereafter been moved sufficiently far to the right to provide clearance between these parts the hook lever will complete its rocking movement in clockwise direction, coming up to bring its lug 260 into interlocking position, and thereafter preventing the tone-arm setter from moving back towards the left until the parts are again released. At such time (release of parts) the action of the spring 266 will serve to snap the hook lever up into its interlocking position, thus completing the desired relationship of parts.

Assume first that the parts stand in the position of Figure 8, wherein the manual control lever is at "stop." In this case the said lever 184 has been rocked to its extreme right hand position, carrying the pin 263 to its maximum height with reference to Fig. 8 of the drawings. In the showing of Figure 8 also the tone-arm setter has been shown interlocked with the hook lever, said tone-arm setter being therefore in its out swung position, and permitting the tone-arm proper to also be swung clear of the records on the turntable. The lug 260 is also shown interlocked with the teeth 177 and 178 of the lug 169. If now the button 66 be rocked to shift the manual control lever 184 to the "manual" position, that is, one notch 188, the pin 263 will be drawn down far enough to just meet the lower end of the slot 262, but without the need of drawing down the link 261. Under these conditions the hook lever will remain interlocked with the lug 169 of the tone-arm setter; but nevertheless the tone-arm proper may be moved inwardly free of said setter, so that said tone-arm may be set to the beginning convolution of the sound track of a record, and such record may be played normally, the tone-arm following the sound track in the normal manner.

If now the button 66 be turned to the next or "automatic" position, the lever 184 will be shifted to the next notch position 188, carrying the pin 263 down a further distance. Such further pin movement will have to be accompanied by down movement of the link 261, since the pin 263 was already in engagement with the lower end of the slot 262 as previously explained for "manual" operation; and thus the slot 264 at the upper end of the link will move down to a position such that its upper end will be close to or even in contact with the pin 265. Under these conditions the spring 266 will produce a component of force tending to rock the hook lever over towards the right and downwardly; but such tendency will be for the time resisted by engagement of the tooth 177 with the lug 260 of the hook lever. Then, by a slight out shift of the tone-arm towards the right, the setter will be carried with the tone-arm and the tooth 177 permitted to disengage from the lug 260. Thereupon the hook lever will be immediately snapped down (counterclockwise rotation) due to the action of the spring 266, to a position where the lug 260 will no longer interfere with free inward movement of the setter, so that thereafter normal operation of the tone-arm setter will occur as long as the button 66 remains in the "automatic" position.

When the button 66 is thereafter shifted back to its "stop" position, carrying the control lever 184 back to the position of Figure 8, the pin 263 will be raised and the link 261 will be permitted to rise. As soon as such rise of the link brings the lower end of the slot 264 against the pin 265, the effect of the spring 266 will be to create a component of force tending to rock the hook lever to the left or clockwise, towards the interlocking position. If at such time the tone-arm setter stands at its clear out or right hand position, so that the lug 169 lies to the right of the path of upswing of the lug 260, then the hook lever may continue its upswing to the interlocking position, such swing being then limited by engagement of the hook lever with the stud 137 as shown in Figure 8; and thereafter when the tone-arm and setter are returned inwardly by a releasing operation, the lug 169 of the tone-arm setter will come into interlocking engagement with the lug 260 of the hook lever and the parts will be locked as desired.

If, when the button 66 is returned to its "stop" position with corresponding rock of the lever 184 as above described, the setter stands so far inwards or towards the left that the lug 169 lies in the path of upswing of the lug 260 of the hook lever. It is evident that the upswing of the hook lever will be interfered with prior to possible interlocking engagement, and the lug 260 of the hook lever will rest against the bottom or forward edge of the lug 169 of the setter, the spring 266 retaining these parts in that condition for the time being. If then the tone-arm and setter be rocked slightly to the right, far enough to carry the lug 169 beyond such interference, the hook lever will complete its rise to the interlocking condition, where it will remain.

The dual function or purpose of the spring 266 is here noted; since in the position of Figure 8, the link 261 is in direct engagement with the hook lever (the lower end of the slot 264 being engaged with the pin 265), said spring 266 exerts a component of force tending to rock the hook lever to the left or clockwise (the slot 262 being so placed that the link is free to move with respect to the pin 263); whereas in the position of Figures 26 and 27, where the link is in direct engagement with the pin 263 (the lower end of the slot 262 being in engagement with said pin), said link is subjected to a component of force from the spring 266 tending to rock the link over towards the right (clockwise) thus simultaneously tending to rock the hook lever to the right (counterclockwise), the relative positions of the pin 265 and slot 264 being such as to permit of this movement.

It is noted that when the last record has been released from the stand and permitted to descend into playing position the slide bar 235 has been placed in condition such that the pin 236 will be engaged by the stop cam 113 when said cam comes around to the position where the shoulder 114 presses said pin 236 to the left and causes discontinuance of drive of the one-cycle cam. This occurs at completion of the playing of such last record. When this has happened the one-cycle cam has already raised the tone-arm and has swung said tone-arm outwardly to its extreme right hand position, free of the records and turntable. In order to then continue the operation (which was discontinued by engagement of the shoulder 114 with the pin 236), the button 66 may be shifted to the "reject" position momentarily, or the head element 241 may be raised. If the button 66 be rocked to the "reject" position, this will rock the lever element 179, and under normal conditions this would restore the functioning of the one-cycle cam drive to complete the cam rotation. However, since the pin 236 is under these conditions still in engagement with the shoulder 114 of the stop cam the desired restoration of one-cycle cam drive will not occur by the foregoing instrumentalities alone, and without other and special provision to meet this contingency. I have here made such provision which I shall now describe:

I have provided a bar 267 pivotally connected to the lever element 179 at the point 268 (see Figure 8). This bar lies between the pin 236 and the hub of the one-cycle cam, and this bar is so formed that its outer portion is relatively narrow, whereas its inner end portion (closer to the pivot pin 268) is widened as shown in Figure 8. Said outer or narrower portion does not interfere with desired engagement of the pin 236 with the shoulder 114 at proper time, but said widened portion is so wide that when it lies between the pin 236 and the hub of the one-cycle cam the pin 236 is prevented from being engaged by the shoulder 114 when said shoulder comes around, or if said shoulder has already engaged with the pin and produced the stopping effect, said widened portion of the bar 267 will force the pin 236 away from the shoulder 114, thus permitting the slide bar 235 to move back into its non-stopping position (under influence of the spring 104a). Thereupon the drive of the one-cycle cam will be continued to the normal completion of its cycle, and the tone-arm and setter will be shifted to their correct positions. This function is as follows:

When the button 66 is moved over to the "reject" position, carrying the lever 184 to corresponding position, the arm 196 of said lever element presses against the arm 197 of the lever element 179, thus rocking the same counterclockwise, tilting the finger 181 down and tripping the pin 117, but more important, this operation serves to carry the bar 267 to the left far enough to perform the functions already described, ensuring the completion of the cycle of movements.

It is noted that when the "repeat" button 71 is moved to the repeat position the crank and link operated thereby are carried beyond the dead center position, so that said repeat mechanism will be retained in the repeat position until the button 71 is again purposely rocked back to the position for normal feeding of records. Suitable stops are provided to ensure limit of movement of these parts in either direction.

While I have herein shown and described only a single embodiment of the features of my present, still I do not intend to limit myself thereto, except as I may do so in the claims to follow.

I claim:

1. In a record changer for the translation of records of more than one predetermined size, a turntable, a tone-arm pivotally mounted so as to cooperate with records disposed on said turntable, a center post having a part whereon the unplayed records are stacked above said turntable and individually fed therefrom to said turntable, a stationary stand located adjacent to the unplayed record stack on said center post for supporting the lowermost record of said record stack at its periphery, driving means for said turntable, means for controlling the record changing cycle of said phonograph including a one cycle cam for controlling movement of said tone-arm outwardly from an extreme inward position to a position clear of the records on said turntable, movable means carried by said stand to effect lateral displacement of said lowermost records supported by said stand and from said part of said center post to permit descent of said lowermost record into playing position on said turntable, means effectively interconnecting said one cycle cam and said movable means to actuate said movable means at a predetermined instant during the record changing cycle when said tone-arm is moved to an extreme outward position clear of the records on said turntable, and means controlled by said unplayed record stack for mechanically disconnecting said one cycle cam from said driving means following movement of said tone-arm outwardly to said position clear of the records on said turntable and prior to actuation of said movable means during the record changing cycle.

2. Means as defined in claim 1 together with manual means for causing continued rotation of said one cycle cam to complete its cycle after such discontinuance of said cam operation.

3. Means as defined in claim 1 together with means to render said rotation discontinuing means ineffective and permit normal completion of the cycle of said one cycle cam.

4. In a record changer phonograph, a rotatable turntable having drive means therefor, means including a stand adjacent said turntable for supporting a stack of unplayed records above said turntable, an ejecting mechanism operative during a record changing cycle to cause the lowermost record of said record stack to move into playing position on said turntable, a movable member engaging the top surface of the topmost record of said record stack and normally sustained in a position above a lower functioning position by the records in said record stack but movable to said lower functioning position when no records remain in said record stack, and mechanical means responsive to the movement of said movable member to its functioning position for disconnecting said drive means from said ejecting mechanism following the playing of the last of the records from said record stack.

5. Means as defined in claim 4 wherein said ejecting mechanism comprises a head element pivotally mounted by a horizontal pivot to said stand.

6. Means as defined in claim 4 wherein said movable member engaging the top surface of the topmost record of said record stack comprises a head element pivotally connected to said stand, together with spring means effective to draw said head element downwardly against the top surface of the topmost record of said stack, and means to reverse the action of said spring means when said head element is overturned from its normal position in engagement with the top surface of the topmost record of said record stack.

7. Means as defined in claim 1, together with means to automatically institute operation of the one cycle cam at completion of movement of the tone-arm inwardly during the playing of a record on said turntable.

8. Means as defined in claim 1, together with means to automatically institute operation of the one cycle cam at the completion of movement of the tone-arm inwardly upon playing of a record on said turntable, and manual means to actuate said one cycle cam operation instituting means independently of the movement of the tone-arm inwardly towards said center post.

9. In a record changer phonograph for the translation of records of more than one predetermined size, a turntable, a tone-arm pivotally mounted so as to cooperate with records disposed on said turntable, a center post having a part whereon the unplayed records are stacked above said turntable and individually fed therefrom to said turntable, a stationary stand located adjacent to the unplayed record stack on said center post for supporting the lowermost record of said record stack at its periphery when said records are of one predetermined size, movable means carried by said stand and movable to effect lateral displacement of said lowermost record supported by said stand for release of such record from said stand and from said part of said center post to permit descent of said lowermost record into playing position on said turntable, a turnover plate pivoted about a horizontal pivot on said stand capable when turned to one position to support at its periphery the lowermost record of a stack of records of another predetermined size, said movable means being effective for said record displacement in either position of said plate, inward moving means tending to move said tone-arm towards said center post, limiting means for limiting the inward movement of said tone-arm towards said center post capable of limiting said tone-arm to two different predetermined positions, an interconnection between said limiting means and said plate effective to shift said limiting means according to the position of said plate to limit inward movement of said tone-arm to two predetermined positions corresponding to the two positions of said plate, said interconnection including relatively movable elements connected to said limiting means and said plate, and resilient elements connected between said plate and said limiting means.

10. In a record changer phonograph for the translation of records of more than one predetermined size, a turntable, a tone-arm pivotally mounted so as to cooperate with records disposed on said turntable, a center post having a part whereon the unplayed records are stacked above said turntable and individually fed therefrom to said turntable, a stationary stand located adjacent to the unplayed record stack on said center post for supporting the lowermost record of said record stack at its periphery when said records are of one predetermined size, movable means carried by said stand and movable to effect lateral displacement of said lowermost record supported by said stand for release of such record from said stand and from said part of said center post to permit descent of said lowermost record into playing position on said turntable, a turnover plate pivoted about a horizontal pivot on said stand capable when turned to one position to support at its periphery the lowermost record of a stack of records of another predetermined size, said movable means being effective for said record displacement in either position of said plate, inward moving means tending to move said tone-arm towards said center post, limiting means for limiting the inward movement of said tone-arm towards said center post capable of limiting said tone-arm to two different predetermined positions, an interconnection between said limiting means and said plate effective to shift said limiting means according to the position of said plate to limit inward movement of said tone-arm to two predetermined positions corresponding to the two positions of said plate, an element movable so as to interfere with movement of said inward moving means to render said inward moving means ineffective when said tone-arm is clear of the records on said turntable, and manual means to actuate said element to a non-interfering position.

11. In a record changer phonograph for the translation of records of more than one predetermined size, a turntable, a tone-arm pivotally mounted so as to cooperate with records disposed on said turntable, a center post having a part whereon the unplayed records are stacked above said turntable and individually fed therefrom to said turntable, a stationary stand located adjacent to the unplayed record stack on said center post for supporting the lowermost record of said record stack at its periphery when said records are of one predetermined size, movable means carried by said stand and movable to effect lateral displacement of said lowermost record supported by said stand for release of such record from said stand and from said part of said center post to permit descent of said lowermost record into playing position on said turntable, a turnover plate pivoted about a horizontal pivot on said stand capable when turned to one position to support at its periphery the lowermost record of a stack of records of another predetermined size, said movable means being effective for said record displacement in either position of said plate, inward moving means tending to move said tone-arm towards said center post, limiting means for limiting the inward movement of said tone-arm towards said center post capable of limiting said tone-arm to two different predetermined positions, an interconnection between said limiting means and said plate effective to shift said limiting means according to the position of said plate to limit inward movement of said tone-arm to two predetermined positions corresponding to the two positions of said plate, an element movable so as to interfere with movement of said inward moving means to render said inward moving means ineffective when said tone-arm is clear of said records on said turntable, and manual means to actuate said element to non-interfering position, said manual means being movable to a plurality of non-interfering positions and into a plurality of interfering positions.

SVEN A. STOLBERG.

REFERENCES CITED

The following references are of record in the file of this patent:

UNITED STATES PATENTS

| Number | Name | Date |
| --- | --- | --- |
| 1,938,810 | Collison et al. | Dec. 12, 1933 |
| 2,287,098 | Habegger | June 23, 1942 |
| 2,295,092 | Offen | Sept. 8, 1942 |
| 2,313,193 | Delchef | Mar. 9, 1943 |
| 2,328,641 | Glaser | Sept. 7, 1943 |
| 2,330,293 | Knox | Sept. 28, 1943 |
| 2,331,383 | Faulkner | Oct. 12, 1943 |
| 2,339,981 | Cranmer et al. | Jan. 25, 1944 |
| 2,371,222 | Compare | Mar. 13, 1945 |
| 2,371,362 | Small | Mar. 13, 1945 |
| 2,395,026 | Weaver | Feb. 19, 1946 |
| 2,490,678 | Dale | Dec. 6, 1949 |